US011243614B2

(12) United States Patent
Nath

(10) Patent No.: US 11,243,614 B2
(45) Date of Patent: Feb. 8, 2022

(54) MODIFIED FORCE SENSITIVE RESISTORS

(71) Applicant: BOSE CORPORATION, Framingham, MA (US)

(72) Inventor: Prateek Nath, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/597,119

(22) Filed: Oct. 9, 2019

(65) Prior Publication Data

US 2021/0109596 A1    Apr. 15, 2021

(51) Int. Cl.
| | | |
|---|---|---|
| *G06F 3/01* | (2006.01) | |
| *G01L 1/04* | (2006.01) | |
| *A63F 13/212* | (2014.01) | |
| *A63F 13/493* | (2014.01) | |
| *A63F 13/235* | (2014.01) | |

(52) U.S. Cl.
CPC .............. *G06F 3/017* (2013.01); *G01L 1/04* (2013.01); *G06F 3/011* (2013.01); *A63F 13/212* (2014.09); *A63F 13/235* (2014.09); *A63F 13/493* (2014.09); *A63F 2300/1012* (2013.01); *A63F 2300/1031* (2013.01); *A63F 2300/636* (2013.01)

(58) Field of Classification Search
CPC . G06F 3/017; G06F 3/011; G01L 1/04; A63F 13/212; A63F 2300/636; A63F 2300/1012; A63F 2300/1031; A63F 13/493; A63F 13/235
See application file for complete search history.

(56) References Cited

U.S. PATENT DOCUMENTS

| | | | | |
|---|---|---|---|---|
| 2009/0326833 | A1* | 12/2009 | Ryhanen ................ | G06F 3/014 702/33 |
| 2010/0259472 | A1* | 10/2010 | Radivojevic ........... | G06F 3/017 345/156 |
| 2013/0181951 | A1* | 7/2013 | Klinghult ............... | G06F 3/0416 345/177 |
| 2014/0240103 | A1* | 8/2014 | Lake ....................... | G06F 3/017 340/12.5 |
| 2015/0220154 | A1* | 8/2015 | Midholt .................. | G06F 3/014 345/156 |
| 2016/0062320 | A1* | 3/2016 | Chung .................... | G06F 3/014 368/282 |
| 2017/0164876 | A1* | 6/2017 | Hyde ...................... | A61B 5/0402 |
| 2018/0348880 | A1* | 12/2018 | Juliato ................... | A61B 5/4519 |

* cited by examiner

*Primary Examiner* — Premal R Patel
(74) *Attorney, Agent, or Firm* — Lando & Anastasi, LLP

(57) ABSTRACT

According to an aspect of the disclosure, a user input device is provided comprising a substrate to couple to a user, a sensing unit coupled to the substrate and including a first sensor of a first type and being configured to generate a first signal indicative of a change in deformation of the user's skin, and a second sensor of a second type different from the first type and being configured to generate a second signal indicative of a deformation level of the user's skin, and a controller configured to receive the first signal and the second signal, determine, based on the first signal, a number of motions performed by a user, determine, based on the second signal, a type of the motions performed by the user, and determine a gesture performed by the user based on the determination of the number of motions and the type of motions.

20 Claims, 15 Drawing Sheets

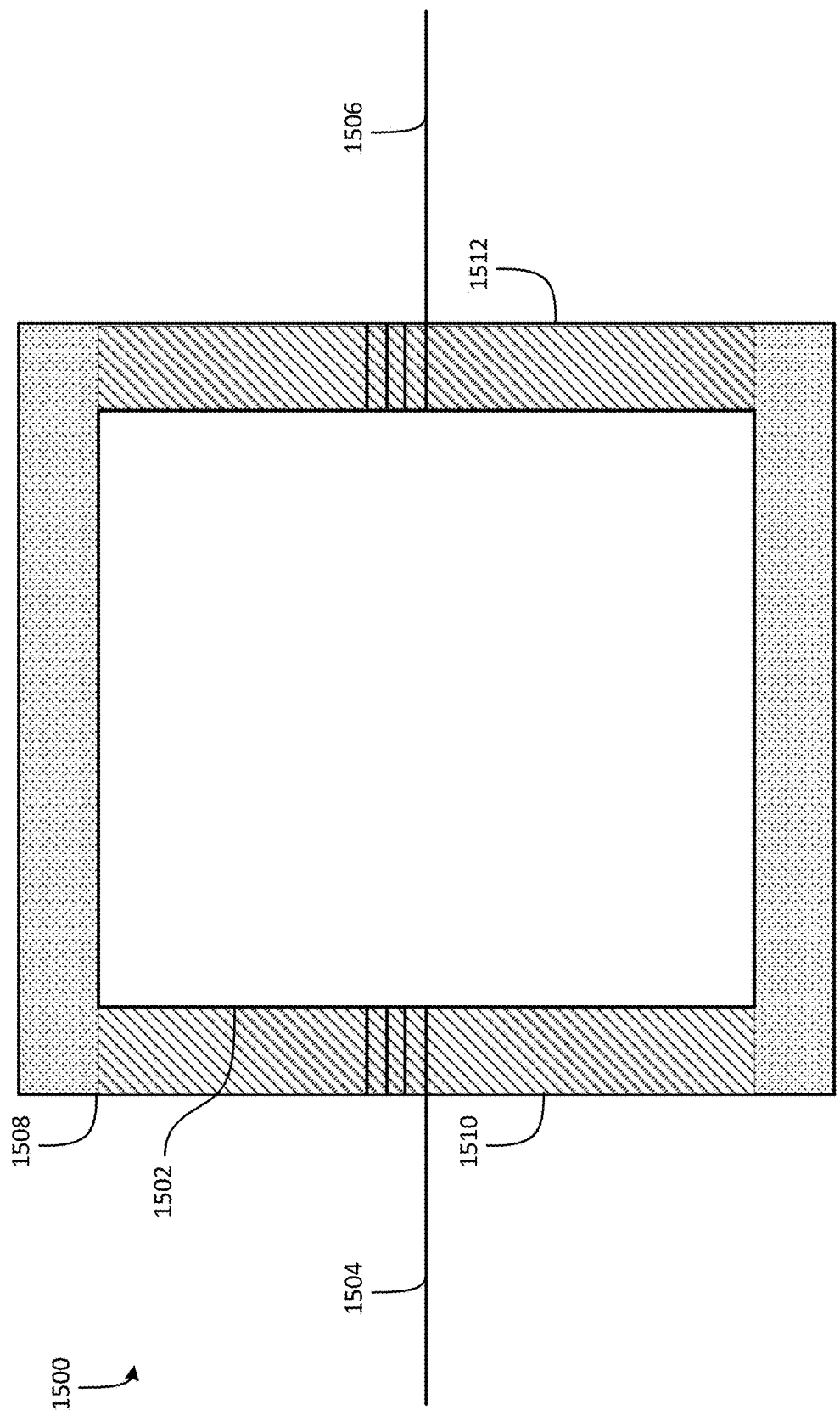

MODIFIED FORCE SENSITIVE RESISTORS

BACKGROUND

1. Field of the Disclosure

At least one example in accordance with the present disclosure relates generally to sensing devices.

2. Discussion of Related Art

User interfaces may include one or more input and/or output components to enable user interaction with a device. For example, a known user input device includes a controller having one or more hardware-implemented actuators which, when actuated by a user, cause the controller to communicate one or more control signals to a device to be controlled. The device to be controlled can execute one or more actions corresponding to the one or more control signals upon receipt of the one or more control signals.

SUMMARY

According to at least one aspect of the present disclosure, a user input device is provided comprising a substrate configured to couple to a user, at least one sensing unit, the at least one sensing unit being coupled to the substrate and being configured to provide an output signal indicative of an amount of deformation of the substrate, and a controller coupled to the at least one sensing unit, the controller being configured to receive, from the at least one sensing unit, the output signal, and determine, based on the output signal, at least one gesture performed by the user.

In various examples, the user input device further includes an inertial measurement unit (IMU) coupled to the substrate, the IMU being configured to provide a second output signal indicative of at least one of an acceleration of the user input device and a rotational speed of the user input device to the controller. In some examples, the controller is further configured to determine at least one second gesture based on the second output signal. In at least one example, the controller is further configured to determine a user input selection corresponding to the at least one gesture, and provide, to a controllable device, a control signal indicative of the user input selection.

In some examples, the at least one sensing unit includes a deformation sensor having at least one physical property that corresponds to deformation of the deformation sensor. In various examples, the deformation sensor is configured to deform responsive to the deformation of the substrate. In at least one example, the output signal is indicative of the at least one physical property. In some examples, the at least one physical property is at least one of an electrical resistance of the deformation sensor, a capacitance of the deformation sensor, and a charge conducted by the deformation sensor.

In at least one example, the user input device includes conductive media configured to be electrically coupled to the controller and to the deformation sensor, wherein the controller is configured to provide a sense signal to the deformation sensor via the conductive media, and receive the output signal from the deformation sensor via the conductive media responsive to providing the sense signal to the deformation sensor. In some examples, the user input device includes a second substrate configured to be coupled to the substrate and the deformation sensor and configured to be electrically coupled to the conductive media, the second substrate being electrically conductive and stretchable.

In some examples, the user input device includes an electrically conductive coupling material coupled to the conductive medium and to the second substrate, the coupling material being configured to facilitate electrical coupling between the conductive medium and the second substrate. In at least one example, the user input device includes a protective coating material coupled to the coupling material, the deformation sensor, the substrate, and the second substrate. In various examples, the substrate and the coating material include silicone, and wherein the coating material has a higher stiffness than the substrate. In some examples, the substrate is configured to be coupled to the user's arm, and is configured to deform under a force applied by movement of the user's arm.

According to at least one aspect of the disclosure, a method of determining a user gesture comprises providing a substrate configured to deform under a force applied responsive to at least one gesture being performed by a user, providing an output signal indicative of the deformation of the substrate, and determining the at least one gesture based on the output signal.

In some examples, the method includes determining a user input selection corresponding to the at least one gesture, and providing a control signal indicative of the user input selection to a controllable device. In various examples, the method includes determining an acceleration of the substrate, providing a second output signal indicative of the acceleration of the substrate, and determining at least one second gesture based on the second output signal.

According to an aspect of the disclosure, a non-transitory computer-readable medium storing thereon sequences of computer-executable instructions for operating a user input device coupled to a user is provided, the sequences of computer-executable instructions including instructions that instruct at least one processor to receive an input signal indicative of deformation of the user input device, determine at least one gesture performed by the user based on the input signal, and determine a user input selection corresponding to the at least one gesture.

In some examples, the instructions further instruct the at least one processor to provide a control signal indicative of the user input selection to a controllable device. In at least one example, the instructions further instruct the at least one processor to receive a second input signal indicative of an acceleration of the user input device, and determine at least one second gesture based on the second input signal.

According to an aspect of the disclosure, a user input device comprises a substrate configured to couple to a user, at least one sensing unit, the at least one sensing unit being coupled to the substrate and including a first sensor of a first sensor type and being configured to generate a first signal indicative of a change in deformation of the user's skin, and a second sensor of a second sensor type different from the first sensor type and being configured to generate a second signal indicative of a deformation level of the user's skin, and a controller coupled to the at least one sensing unit, the controller being configured to receive, from the at least one sensing unit, the first signal and the second signal, determine, based on the first signal, a number of one or more motions performed by a user, determine, based on the second signal, a type of the motions performed by the user, and determine at least one gesture performed by the user based on the determination of the number of the one or more motions and the type of the motions performed by the user.

In some examples, the controller is further configured to determine a user input selection corresponding to the at least one gesture, and provide control signals indicative of the user input selection to a controllable device. In various examples, the first sensor is directly adjacent to the second sensor. In at least one example, the first sensor includes a piezoelectric material. In some examples, the first sensor includes a polyvinyl difluoride film. In various examples, the user input device includes a deformable material coupled to the second sensor, the deformable material being configured to interface with the user's skin.

In some examples, the deformable material reduces a pressure applied by the second sensor to the user's skin relative to a pressure applied by the second sensor without the deformable material. In at least one example, the second sensor is configured to sense a pressure applied to the second sensor. In various examples, the deformable material is configured to translate a non-normal force from the user's skin to a normal force on the second sensor.

In various examples, the user input device includes an electrically insulating material coupled to the deformable material and to the first sensor, wherein the deformable material and the first sensor are configured to interface with the user's skin via the electrically insulating material. In some examples, the at least one sensing unit includes a plurality of sensing units. In at least one example, the user input device includes at least one fastener configured to couple the user input device to the user. In some examples, the at least one fastener is configured to enable the user input device to couple to the user's wrist.

According to an aspect of the disclosure, a method of determining a user gesture comprises determining, by a first sensor of a first type, a change in deformation of a user's skin, generating a first output indicative of the change in deformation of the user's skin, determining, by a second sensor of a second type different from the first sensor type, a deformation level of the user's skin, generating a second output indicative of the deformation level of the user's skin, determining, based on the first signal, a number of one or more motions performed by a user, determining, based on the second signal, a type of the motions performed by the user, and determining, based on the number of the one or more motions performed by the user and the type of motions performed by the user, at least one gesture performed by the user.

In various examples, the method includes determining a user input selection corresponding to the at least one gesture, and providing a control signal indicative of the user input selection to a controllable device. In some examples, the method includes providing a user input device configured to couple around a user's wrist, the user input device being configured to determine the at least one gesture. In at least one example, the method includes translating, by a deformable material coupled to the second sensor, a non-normal force from the user's skin to a normal force on the second sensor. In some examples, the method includes reducing, by the deformable material, a pressure applied to the user's skin by the second sensor.

According to an aspect of the disclosure, a non-transitory computer-readable medium storing thereon sequences of computer-executable instructions for operating a user input device is provided, the sequences of computer-executable instructions including instructions that instruct at least one processor to receive a first signal from a first sensor of a first type of at least one sensing unit, the first signal being indicative of a change in deformation of a user's skin, receive a second signal from a second sensor of a second type different from the first sensor type of the at least one sensing unit, the second signal being indicative of a deformation level of the user's skin, determine, based on the first signal, a number of one or more motions performed by a user, determine, based on the second signal, a type of the motions performed by the user, and determine at least one gesture performed by the user based on the number of the one or more motions performed by the user and the type of motions performed by the user.

In various examples, the instructions are further configured to instruct the at least one processor to determine a user input selection corresponding to the at least one gesture, and provide a control signal indicative of the user input selection to a controllable device.

According to an aspect of the disclosure, a sensing device is provided comprising a substrate configured to couple to an arm of a user, a sensing unit coupled to the substrate and being configured to provide at least one output signal indicative of an amount of deformation of the sensing unit, and a controller coupled to the sensing unit, the controller being configured to receive, from the sensing unit, the at least one output signal, and determine, based on the at least one output signal, a heart rate of the user.

In some examples, the substrate is a stretchable substrate. In various examples, the substrate is configured to couple around a wrist of a user. In at least one example, the at least one output signal is indicative of a force applied by a radial artery of the user. In some examples, the at least one output signal is indicative of a force applied by a blood vessel of the user. In various examples, the force applied by the blood vessel of the user is indicative of a period of a cardiac cycle of the user, and wherein the at least one output signal indicative of the amount of deformation of the sensing unit is indicative of the period of the cardiac cycle of the user.

In various examples, the sensing unit includes a deformation sensor having at least one physical property that corresponds to deformation of the deformation sensor. In at least one example, the at least one output signal is indicative of the at least one physical property. In some examples, the at least one physical property is at least one of an electrical resistance of the deformation sensor, a capacitance of the deformation sensor, and a charge conducted by the deformation sensor. In at least one example, the user input device includes conductive media configured to be electrically coupled to the controller and to the deformation sensor, wherein the controller is configured to provide at least one sense signal to the deformation sensor via the conductive media, and receive the at least one output signal from the deformation sensor via the conductive media responsive to providing the at least one sense signal to the deformation sensor.

In at least one example, the user input device includes a frame configured to be coupled around the deformation sensor, the frame being conductive at a plurality of portions of the frame. In some examples, the substrate is an article of clothing worn by the user. In various examples, the article of clothing includes one of a shirt and a glove. In at least one example, the user input device includes a second substrate configured to encapsulate the controller and the sensing unit. In some examples, the second substrate includes a polymer material.

According to at least one aspect of the disclosure, a method of determining a heart rate of a user is provided comprising providing a sensing unit configured to couple to an arm of a user and deform in response to a force exerted by a heart of the user, providing at least one output signal indicative of the deformation of the sensing unit, and determining the heart rate of the user based on the at least one output signal.

In some examples, the method includes deforming, by the sensing unit, in response to a force exerted on the sensing unit by a blood vessel of the user. In various examples, the force applied by the blood vessel of the user is indicative of a period of a cardiac cycle of the user, and wherein the at least one output signal indicative of the amount of deformation of the substrate is indicative of the period of the cardiac cycle of the user. In at least one example, determining the heart rate of the user includes determining the period of the cardiac cycle of the user based on the at least one output signal, and determining a number of cardiac cycles in a period of time.

According to at least one aspect of the disclosure, a non-transitory computer-readable medium storing thereon sequences of computer-executable instructions for operating a sensing device coupled to an arm of a user is provided, the sequences of computer-executable instructions including instructions that instruct at least one processor to receive an input signal indicative of deformation of the sensing device, determine a cardiac cycle of the user based on the input signal, and determine a heart rate of the user based on the cardiac cycle.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 15 illustrates a schematic view of a sensing unit according to an example.

DETAILED DESCRIPTION

Figure 1:
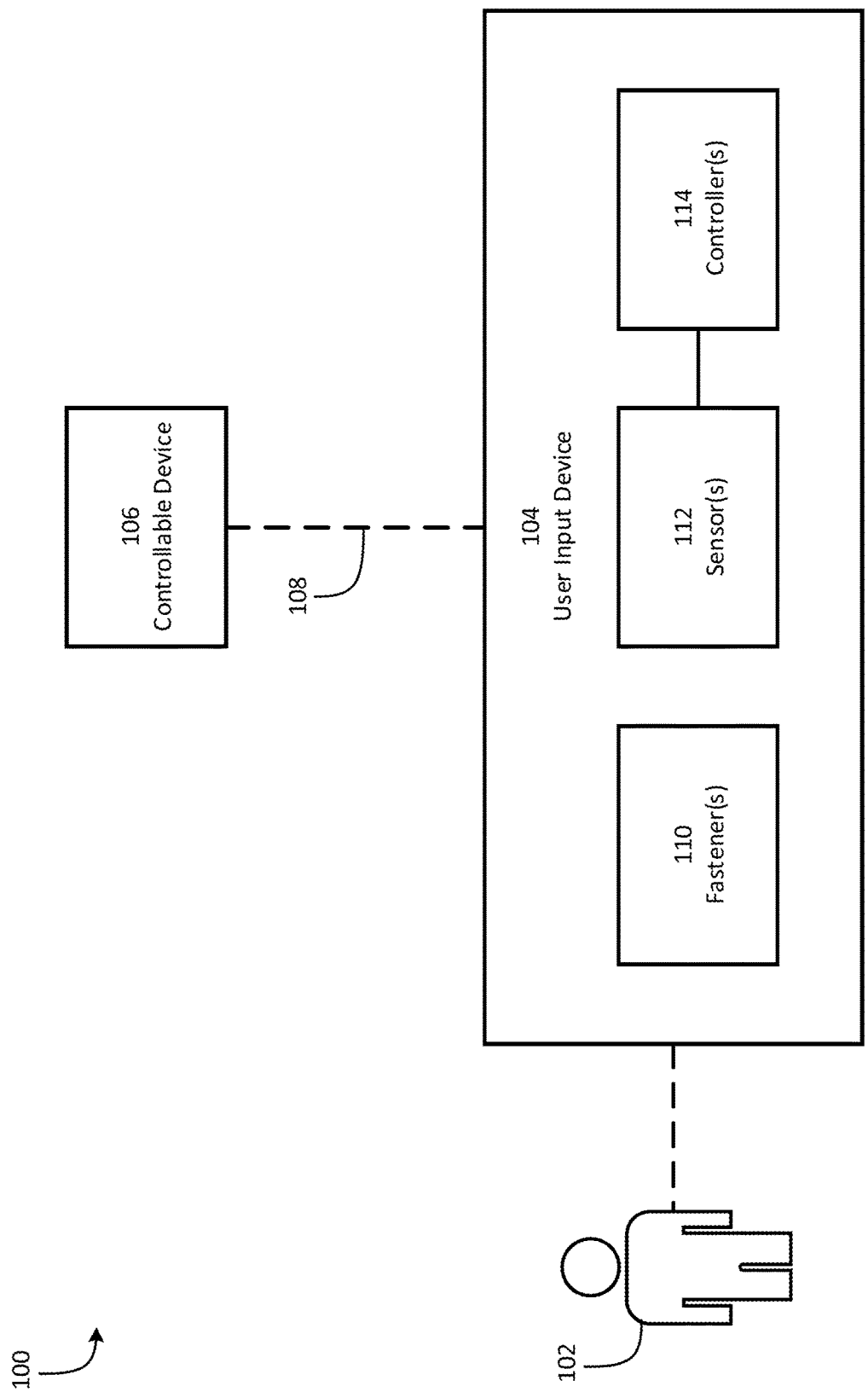
FIG. 1 illustrates a block diagram of a user input system according to an example.

Examples of the disclosure provide user input devices configured to detect user gestures and generate user input signals based on the detected user gestures. In one example, a user input device is configured to be connected around a user's wrist. The user input device includes a stretchable band and a plurality of deformation sensors coupled to the stretchable band. User gestures may stretch or deform the stretchable band which, in turn, deforms at least one of the deformation sensors. The at least one deformation sensor may generate a signal indicative of the deformation and transmit the signal to a processor or controller. The processor or controller may receive the signal and determine a user gesture based on the signal. The processor or controller may send one or more control signals to a controllable device based on a user input selection mapped to the gesture. In this example, therefore, user gestures may be detected and used to generate one or more control signals to control a controllable device.

In another example, a user input device is configured to be connected around a user's wrist. The user input device includes a band and a plurality of co-located planar force sensors and piezoelectric sensors. Each planar sensor may include a deformable cap configured to interface with a user's skin, and may generate a signal having a magnitude correlated to a normal force applied to the respective planar sensor. Each piezoelectric sensor may include a polyvinyl difluoride film, and may generate a transient and/or non-vanishing signal responsive to a change in pressure being applied to the piezoelectric sensor. The signals generated by the co-located planar sensors and piezoelectric sensors may be transmitted to a processor or controller configured to determine a user gesture based on the signals. The processor or controller may send one or more control signals to a controllable device based on a user input selection mapped to the gesture. In this example, therefore, user gestures may be detected and used to generate one or more control signals to control a controllable device.

In another example, a device is configured to determine user biological information in addition to, or in lieu of, determining user gestures and/or motions. The device includes a sensor, such as a deformation sensor, configured to determine a force exerted on the sensor by a user's blood vessel. For example, the sensor may be coupled to a user's skin near a blood vessel of the user. Determining the force exerted on the sensor over a period of time enables the device to identify a systolic and diastolic period of a user's cardiac cycle, and determine the user's heart rate based on the duration of the user's cardiac cycle.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements, or acts of the systems and methods herein referred to in the singular may also embrace examples including a plurality, and any references in plural to any example, component, element or act herein may also embrace examples including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, known user input devices may be implemented in connection with one or more hardware components, such as actuators implemented in a handheld controller, computer mouse, or other user input device. Such user input devices require a user to manually interface with the controller (for example, by manually actuating one or more actuators with a user's fingers) and at least partially hold the controller in the user's hand, which may be inconvenient. Furthermore, a number of commands that may be input by the user may be limited by a number of actuators on the controller which is, in turn, limited by a size of the controller. Accordingly, known user input devices may be disadvantageously inconvenient to use and may support a limited number of commands.

Examples of the disclosure include user input devices that sense motions and/or gestures made by a user operating the user input device. Motions may include movements of a user's body, such as an acceleration of a user's arm. Gestures may include any actions or movements performed by a user. For example, gestures may include touching a thumb and index finger together once, touching a thumb and index finger together two or more times in rapid succession, touching a ring finger to a user's palm, and so forth. As a user performs a gesture, portions of a user's body may move and deform. For example, in clenching a user's fist, portions of the user's wrist may move and deform. The skin on a user's wrist may become more or less taut, and muscles, veins, tendons, and so forth may shift under the user's skin, causing movement and deformation of the user's skin.

User input devices described herein may sense physical movements on or in a user's body arising from the user performing a gesture. For example, a user input device may be connected around a user's wrist and may sense physical movements of and around the wrist arising from hand-based gestures. Although certain examples are provided in which gestures or motions are "large," or conspicuous (that is, easily observable by a human observer of the individual performing the gestures or motions), examples disclosed herein may also sense physical movements arising from a user performing "small," or inconspicuous gestures or motions (that is, not easily observable by a human observer of the individual performing the gestures or motions). Thus, examples disclosed herein are applicable to any motions or gestures regardless of how significant or large the gestures or motions are.

In examples in which user input devices are configured to be connected around a user's wrist, a user is capable of providing input actions or commands without being required to hold any device in the user's hands. Furthermore, because the user input device detects user gestures as inputs and thus does not require a hardware component to be dedicated to each input action or command, a size of the user input device may be advantageously independent of a number of commands supported by the user input device. Accordingly, example user input devices may be more convenient than known user input devices and may be capable of detecting a greater range of gestures, and therefore supporting a greater number of user commands, than known user input devices.

FIG. 1 illustrates a block diagram of a user input system 100 according to an example. The user input system 100 includes a user 102, a user input device 104, and a controllable device 106. The user input device 104 is communicatively coupled to the controllable device 106, and may provide control signals 108 to the controllable device 106. The control signals 108 may be communicated via a wired or wireless medium. In some examples, the user input device 104 may be coupled to the user 102 and may receive inputs from the user 102. For example, the user input device 104 may be coupled to the user's 102 arm (such as a wrist, hand, forearm, and so forth).

The controllable device 106 may be any device capable of receiving a user input. For example, the controllable device 106 may be a desktop computer, a laptop computer, a tablet computer, a cellular phone, a gaming console, a television, a household appliance, or any other device that may be capable of receiving a user input. For example, the user 102 may provide user inputs to the user input device 104, and the user input device 104 may provide the control signals 108 to the controllable device 106. The controllable device 106, responsive to receiving the control signals 108, may take one or more actions corresponding to the user input indicated by the control signals 108. Thus, the user 102 is capable of controlling the controllable device 106 via the user input device 104.

User inputs provided by the user 102 may include motions or gestures performed by the user 102. In one example, the user input device 104 determines motions or gestures performed by the user 102 and determines a user input action or command corresponding to a determined gesture. For example, the user input device 104 may be configured to determine motions or gestures performed using the hand or arm of the user 102, determine an action or command corresponding to the motion or gesture, and provide the control signals 108 based on the determination.

The user input device 104 includes fastener(s) 110, sensor(s) 112, and controller(s) 114. In one example, the user input device 104 is configured to be coupled to the user 102 to determine motions or gestures made by the user 102. The fastener(s) 110 may be configured to couple the user input device 104 to a user. For example, the fastener(s) 110 may enable the user input device 104 to be coupled to or around a user's wrist such that the user input device 104 may determine hand-based motions or gestures performed by a user. The fastener(s) 110 may include one of several types of fasteners. For example, where the user input device 104 is to be coupled around (for example, encircling) a user's wrist, the fastener(s) 110 may include hook-and-loop, buckles, straps, magnets, buttons, snap fasteners, adhesives, zippers, a combination of the foregoing, or other fasteners.

In various examples, the sensor(s) 112 are configured to sense parameters and/or information indicative of a gesture performed by a user. For example, the sensor(s) 112 may sense parameters and/or information indicative of a tautness of a user's skin, movement of a user's muscles, veins, and tendons in and around the wrist, a position and/or orientation of a user's arm and/or hand, or any other parameters and/or information indicative of a gesture or motion performed by a user. As discussed in greater detail below with respect to FIGS. 3 and 7, in one example, the sensor(s) 112 include an inertial measurement unit (IMU) and one or more deformation sensors configured to sense deformation of the user input device 104 in response to motions or gestures performed by a user, and/or one or more piezoelectric sensors and force-sensing resistors configured to sense deformation of a user's skin in response to motions or gestures performed by the user.

In some examples, the controller(s) 114 are configured to receive the sensed parameters and/or information from the sensor(s) 112, determine a user gesture based on the parameters and/or information, determine an action or command corresponding to the gesture, and execute the action or provide an indication of the action to the controllable device 106. For example, the controller(s) 114 may provide the control signals 108 to the controllable device 106 including the indication of the action or command. The controllable device 106 may execute one or more actions based on the control signals 108.

Figure 2:
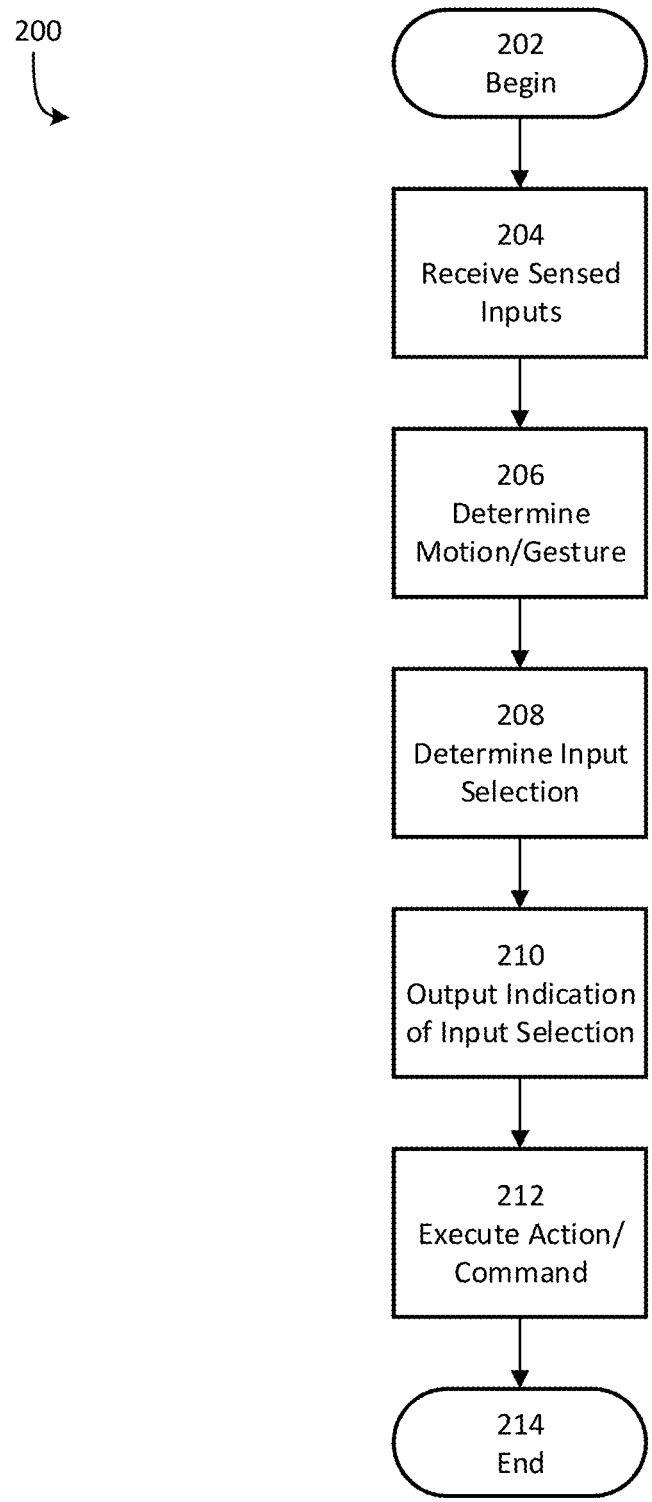
FIG. 2 illustrates a process of providing user inputs according to an example.

FIG. 2 illustrates a process 200 of providing user inputs according to an example. The process 200 may be executed in connection with the user input system 100.

At act 202, the process 200 begins.

At act 204, a user input is sensed by the user input device 104. The user input may be a motion or gesture performed by the user 102. As discussed above, the sensor(s) 112 may sense parameters and information resulting from changes in, on, or relating to the user's 102 body when a motion or gesture is performed. For example, where the user input device 104 is coupled around a user's wrist, changes may include changes in a tautness of a user's skin, movement of a user's muscles, veins, and tendons in and around the wrist, a position and/or orientation of a user's arm and/or hand, and so forth, that accompany the performance of a motion or gesture. The sensor(s) 112 provide the parameters and/or information indicative of the sensed input to the controller(s) 114.

At act 206, a gesture or motion is determined. The controller(s) 114 may determine the gesture or motion based on the parameters and/or information provided by the sensor(s) 112. In some examples, the controller(s) 114 are capable of determining any gesture or motion performed by a user based on information received from the sensor(s) 112. In other examples, the controller(s) 114 are configured to determine a specific set of gestures or motions, each being uniquely associated with certain respective parameters or information sensed at act 204. For example, the controller(s) 114 may be configured to identify, based on the parameters and/or information, which motion or gesture of a set of motions or gestures the parameters and/or information are most likely to correspond to.

At act 208, a user input selection is determined. The controller(s) 114 may determine a user input selection corresponding to the determined motion or gesture. The controller(s) 114 may access a stored mapping (for example, stored in remote or local memory or storage) of gestures or motions to input selections. For example, the controller(s) 114 may determine that one gesture or motion (for example, touching a thumb and middle finger together) is mapped to a first user input selection, that another gesture or motion (for example, touching a middle finger to a palm) is mapped to a second user input selection, and so forth.

A mapping between motions and/or gestures and user input selections may be pre-determined, or a user may be capable of mapping motions and/or gestures to user input selections. For example, a user may control the user input device 104 to enter a learning mode in which the user 102 performs a motion and/or gesture while using the user input device 104, with the user input device 104 then mapping the motion and/or gesture determined by the user input device 104 to a user input selection. In other examples, a user may be capable of mapping a pre-determined list of motions and/or gestures to user input selections. Moreover, in some examples, detecting that a user has not performed any motion or gesture may itself be mapped to a particular user input selection, such that "no movement" or "no gesture" is a determinable state.

At act 210, an indication of the determined user input selection is output. For example, the controller(s) 114 may output the determined user input selection to the controllable device 106 as the control signals 108. In some examples, the controller(s) 114 include at least one communication interface to enable the output of the control signals. For example, the controller(s) 114 may include an antenna configured to output the control signals 108 as electromagnetic signals. In other examples, other communication media may be used.

At act 212, an action or command corresponding to the user input selection is executed. For example, the controllable device 106 may execute the action or command. The controllable device 106 may maintain a mapping of user input selections to actions or commands. For example, a first user input selection may be mapped to a command to change a mode of operation (for example, from a sleep mode to an active mode) of the controllable device 106. Aspects of the actions or commands, including a number of the actions or commands, may be determined by or in connection with the controllable device 106. For example, the controllable device 106 may be configured to support a certain set of specific commands, which may or may not be configurable by a user. That is, in some examples, a user may be able to manipulate a mapping of user input selections to actions or commands via the controllable device 106. Thus, in these examples, a user may control which gestures or motions result in which actions or commands executed by the controllable device 106. At act 214, the process 200 ends.

An example is provided for purposes of illustration only. In this example, the user input device 104 is attached around a wrist of the user 102 and is configured to sense motions and/or gestures performed by the user 102. The controllable device 106 is implemented as a gaming console in this example, and includes or is otherwise coupled to a display to display visual details of a game hosted by the gaming console. The user input device 104 is configured to communicate the control signals 108 to the controllable device 106 via a wireless medium. In one example, the controller(s) 114 include an antenna configured to output electromagnetic radiation to the controllable device 106.

At a first time, a game hosted by the controllable device 106 is paused. The user 102 performs a first gesture to resume the game. For example, the user 102 may touch a ring finger and thumb together. The user input device 104 senses, via the sensor(s) 112, physical changes in, on, or relating to the user's 102 body resulting from the first gesture. For example, the sensor(s) 112 may include one or more deformation sensors configured to deform under forces exerted by movement of the user's 102 skin, muscles, tendons, and so forth when the user performs the first gesture, or may include one or more piezoelectric sensors and/or force-sensing resistors to sense deformation of the user's 102 skin.

The controller(s) 114 determine, based on information determined by the sensor(s) 112, that the user touched a ring finger and thumb together. The controller(s) 114 determine that the gesture corresponds to a first user input selection, and sends the control signals 108 encoding the first user input selection to the controllable device 106. The controllable device 106 receives the control signals 108 and determines that, when the game hosted by the controllable device 106 is paused, the first user input selection is mapped to a "resume game" action or command. The controllable device 106 executes the action or command by, in this example, resuming the game.

At a second time, after resuming the game, the user 102 wishes to adjust a point-of-view in the game hosted by the controllable device 106. The user 102 performs a second gesture to adjust an in-game point-of-view. For example, the user 102 may move a hand to the left with the intention of panning the point-of-view in the game to the left. The user input device 104 senses, via the sensor(s) 112, physical changes in, on, or relating to the user's 102 body resulting from the second gesture. For example, the sensor(s) 112 may include one or more accelerometers configured to determine motion of the user input device 104.

The controller(s) 114 determine, based on information determined by the sensor(s) 112, that the user moved a hand to the left. The controller(s) 114 determine that the gesture corresponds to a second user input selection, and sends the control signals 108 encoding the second user input selection to the controllable device 106. The controllable device 106 receives the control signals 108 and determines that the second user input selection is mapped to a "pan point-of-view left" action or command. The controllable device 106 executes the action or command by, in this example, panning the point-of-view displayed on the display to the left.

At a third time, after panning the point-of-view to the left, the user 102 wishes to select an object centered in the point-of-view in the game hosted by the controllable device 106. The user 102 performs a third gesture to select the object in the game. For example, the user 102 may touch a little finger and thumb together with the intention of selecting the object. The user input device 104 senses, via the sensor(s) 112, physical changes in, on, or relating to the user's 102 body resulting from the third gesture. For example, the sensor(s) 112 may include one or more deformation sensors configured to deform under forces exerted by movement of the user's 102 skin, muscles, tendons, and so forth when the user performs the third gesture, or may include one or more piezoelectric sensors and/or force-sensing resistors to sense deformation of the user's 102 skin.

The controller(s) 114 determine, based on information determined by the sensor(s) 112, that the user touched a little finger and a thumb together. The controller(s) 114 determine that the gesture corresponds to a third user input selection, and sends the control signals 108 encoding the third user input selection to the controllable device 106. The controllable device 106 receives the control signals 108 and determines that the third user input selection is mapped to a "select object" action or command. The controllable device 106 executes the action or command by, in this example, selecting the object. The user 102 may continue playing the game hosted by the controllable device 106 using the user input device 104 using these and similar commands.

Figure 3:
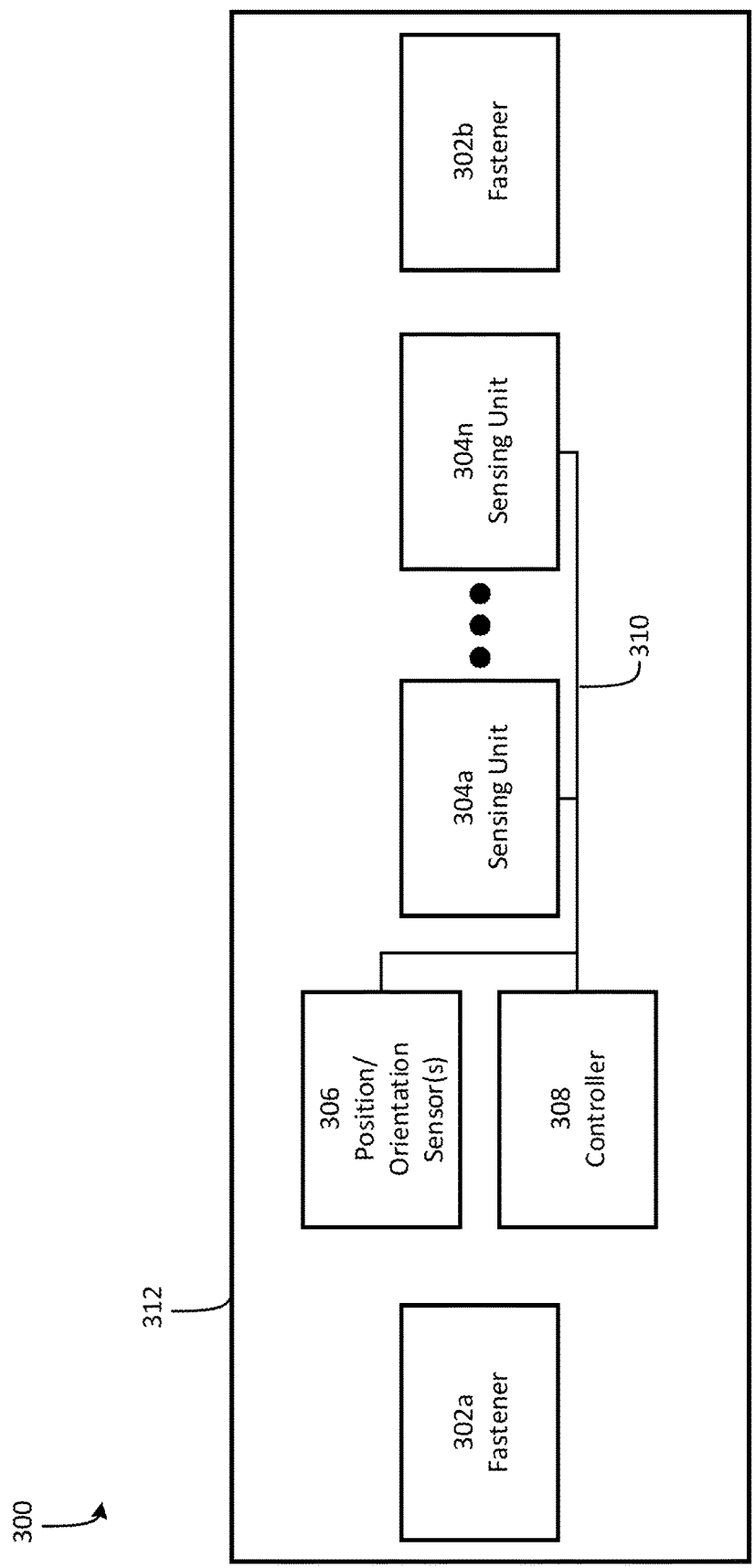
FIG. 3 illustrates a block diagram of a first user input device according to an example.

FIG. 3 illustrates a schematic diagram of a user input device 300 according to an example. The user input device 300 may determine gestures performed by a user. The user input device 300 includes fasteners 302, which include a fastener 302a and a fastener 302b, sensing units 304, which include sensing units 304a-304n, a position and/or orientation sensing unit 306, and a controller 308. The sensing units 304 and the position and/or orientation sensing unit 306 are electrically and/or communicatively coupled to the controller 308 via a medium 310. The components 302-308 are mechanically coupled to a substrate 312.

In one example, the user input device 300 may be an example of the user input device 104. For example, fasteners 302 may be an example of, or included in, the fastener(s) 110. The sensing units 304 and the position and/or orientation sensing unit 306 may be an example of, or included in, the sensor(s) 112. The controller 308 may be an example of, or included in, the controller(s) 114.

The user input device 300 may be configured to determine gestures performed by a user at least in part by sensing deformations in the user input device 300 resulting from gestures performed by the user. In one example, the substrate 312 is a stretchable band configured to deform responsive to a user of the user input device 300 performing a gesture. That is, the substrate 312 is a band capable of undergoing deformation in response to user gestures (for example, tensile deformation, compressive deformation, bending deformation, and so forth). For example, the stretchable band may be coupled around a user's wrist or forearm. The fasteners 302 may facilitate the coupling of the stretchable band around the user's wrist or forearm. For example, the fasteners 302 may include hook-and-loop such that, when the substrate 312 is coupled around a user's wrist or forearm, the fastener 302a (which may include, for example, a "hook" material) and the fastener 302b (which may include, for example, a "loop" material) overlap and couple together.

The sensing units 304 may determine information indicative of user gestures as the substrate 312 is stretched by the user gestures, and provide the information to the controller 308 via the medium 310. For example, and as discussed in greater detail below with respect to FIG. 4, the sensing units 304 may include one or more deformation sensors configured to determine a magnitude and location of stretching of the substrate 312.

The position and/or orientation sensing unit 306 may include one or more sensors configured to determine information indicative of a position and/or orientation of the user input device 300 as the user input device 300 is moved or re-oriented, and provide the position and/or orientation information to the controller 308 via the medium 310. For example, the position and/or orientation sensing unit 306 may include one or more accelerometers (to determine, for example, a linear acceleration of the user input device 300), gyroscopes (to determine, for example, a rotational speed of the user input device 300), magnetometers, or other sensors. In some examples, the position and/or orientation sensing unit 306 include an IMU configured to determine one or more of a specific force, angular rate, and orientation of the user input device 300.

The controller 308 receives information from one or more of the sensing units 304 and/or the position and/or orientation sensing unit 306 via the medium 310. Based on the information provided by one or both of the sensing units 304 and the position and/or orientation sensing unit 306, the controller 308 determines a user gesture, determines a user input selection corresponding to the user gesture, and provides the user input selection to a controllable device. For example, the controller 308 may include a communication interface to enable control signals encoding the user input selection to be output to one or more controllable devices.

Figure 4:
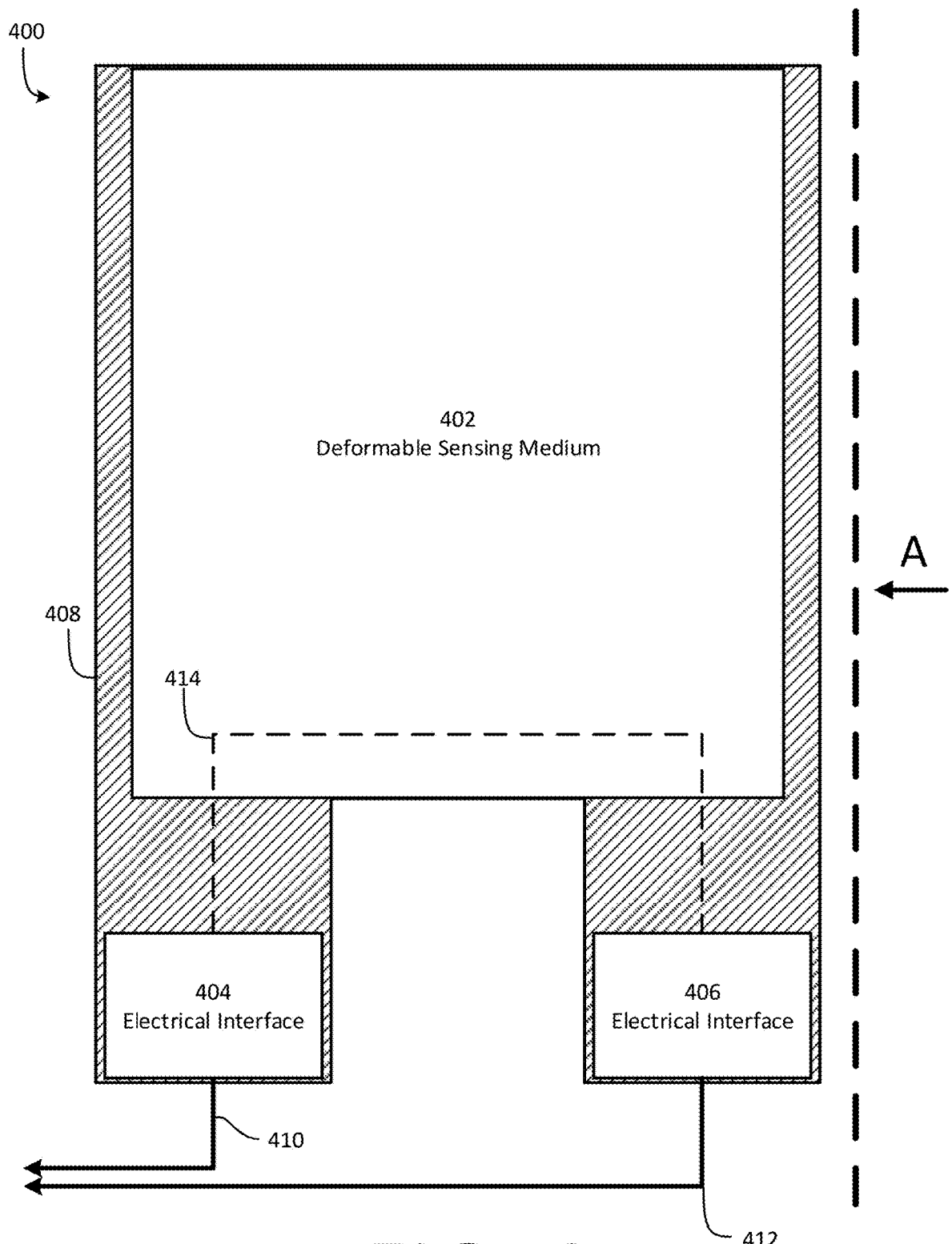
FIG. 4 illustrates a schematic diagram of a first sensing unit according to an example.

FIG. 4 illustrates a schematic diagram of a sensing unit 400 according to an example. For example, the sensing unit 400 may be included in an example of one or more of the sensing units 304. The sensing unit 400 includes a deformable sensing medium 402, a first electrical interface 404, a second electrical interface 406, a substrate 408, a first electrical connection 410, and a second electrical connection 412. The sensing unit 400 may be coated in one or more protective coatings as discussed in greater detail below with respect to FIG. 5, which illustrates one example of the sensing unit 400 as seen along axis A of FIG. 4.

The deformable sensing medium 402, the first electrical interface 404, and the second electrical interface 406 are physically coupled to the substrate 408. The substrate 408 may, in turn, be coupled to a second substrate, such as the substrate 312. The first electrical interface 404 is electrically coupled to the second electrical interface 406 via a conductive path 414. The first electrical interface 404 is also electrically coupled to the first electrical connection 410, which may be coupled to a controller such as the controller 308. The second electrical interface 406 is electrically coupled to the second electrical connection 412, which may be coupled to a controller such as the controller 308. The first electrical connection 410 and the second electrical connection 412 may be included in an example of the medium 310.

The deformable sensing medium 402 will now be discussed in greater detail. The deformable sensing medium 402 is configured to deform in response to deformation forces exerted on the deformable sensing medium 402, and sense a magnitude of the deformation. As discussed in greater detail below, the deformation forces may be exerted by stretching and/or deformation of the substrate 312 and/or the substrate 408 as a user performs gestures or motions. That is, as the substrate 312 and/or the substrate 408 stretches in response to user gestures or motions, deformation forces may be exerted on the deformable sensing medium 402 at least because the deformable sensing medium 402 is physically coupled to the substrate 408, and therefore may deform as the substrate 408 stretches.

In one example, the deformable sensing medium 402 includes a material having a physical property that corresponds to a degree of deformation of the deformable sensing medium 402. The physical property may include one of several physical properties including, for example, an electrical resistance, an electrical capacitance, an induced charge (for example, a piezoelectrically induced charge), an inductance, a refraction index, a dielectric constant, or other properties. For example, the deformable sensing medium 402 may include a material or materials having a resistance that changes responsive to deformation of the deformable sensing medium 402, such as viscoelastic graphene-polymer nanocomposites as described in *Sensitive Electromechanical Sensors Using Viscoelastic Graphene-Polymer Nanocomposites*, Conor S. Boland et al., which is hereby incorporated by reference in its entirety.

As appreciated by those of ordinary skill in the art, a resistance of an entity may be expressed as, $$R = \frac{\rho L}{A}$$

where R is a resistance of the entity, $\rho$ is a resistivity of the entity, L is a length of the entity, and A is a cross-sectional area of the entity. In examples in which the deformable sensing medium 402 includes a material or materials having a resistance that changes responsive to deformation, the material or materials may more particularly have a resistivity that changes responsive to deformation, which, in turn, modulates a resistance of the deformable sensing medium 402.

In examples in which the deformable sensing medium 402 changes resistance responsive to deformation of the deformable sensing medium 402, an electrical signal passing through the deformable sensing medium 402 (for example, via the conductive path 414) may vary based on a resistance of the deformable sensing medium 402. For example, a current and/or voltage of the electrical signal may vary based on a resistance of the deformable sensing medium 402. A resistance of the deformable sensing medium 402, which may be indicative of a degree and/or speed of deformation of the substrates 312, 408 and consequently a gesture or motion performed by the user, may therefore be sensed by providing an electrical signal to the deformable sensing medium 402 via the conductive path 414.

The first electrical interface 404 and the second electrical interface 406 will now be discussed in greater detail. As discussed in greater detail below with respect to FIG. 5, the electrical interfaces 404, 406 may, at least in part, provide an electrical interface between the electrical connections 410, 412 and the deformable sensing medium 402. For example, the electrical interfaces 404, 406 may facilitate a physical and electrical connection between the electrical connections 410, 412 and the substrate 408 which may, in turn, be electrically coupled to the deformable sensing medium 402.

In a first example, a sensing signal may be provided from a controller, such as the controller 308, to the first electrical interface 404 via the first electrical connection 410. The sensing signal may pass from the first electrical interface 404 to the second electrical interface 406 via the conductive path 414. The sensing signal may pass from the second electrical interface 406 back to the controller via the second electrical connection 412.

In a second example, a sensing signal may be provided from a controller, such as the controller 308, to the second electrical interface 406 via the second electrical connection 412. The sensing signal may pass from the second electrical interface 406 to the first electrical interface 404 via the conductive path 414. The sensing signal may pass from the first electrical interface 404 back to the controller via the first electrical connection 410.

As discussed above, properties of the sensing signal (for example, a current and/or voltage of the sensing signal) may vary based on a resistance of the deformable sensing medium 402 in either example, where the resistance of the deformable sensing medium 402 may vary based on a deformation of the deformable sensing medium 402. Accordingly, a controller coupled to the electrical connections 410, 412, such as the controller 308, may analyze the sensing signal to determine a deformation of the deformable sensing medium 402 via the electrical connections 410, 412 and the electrical interfaces 404, 406.

The substrate 408 will now be discussed in greater detail. In some examples, the substrate 408 includes a material capable of undergoing tensile deformation in response to user gestures. That is, the substrate 408 may include a stretchable material capable of stretching as a user performs gestures. As discussed above, the substrate 408 may be physically coupled to the deformable sensing medium 402. As the substrate 408 stretches and/or deforms, the substrate 408 may exert deformation forces on the deformable sensing medium 402. In various examples, the substrate 408 may be physically coupled to another stretchable substrate, such as the substrate 312.

The substrate 408 may provide or facilitate an electrical connection between the interfaces 404, 406 and the deformable sensing medium 402 via the conductive path 414. In one example, the substrate 408 includes a conductive material. For example, the substrate 408 may include a conductive fabric. Thus, signals may be conducted along the conductive path 414 via the substrate 408. In other examples, the substrate 408 may be a non-conductive fabric, but may have a conductive medium applied to the substrate 408. For example, the substrate 408 may be non-conductive, but may have conductive ink, ink pads, embedded conductors (for example, wires or strands pads), polymers with embedded conductive traces, or other conductive media, applied to, in, or on the substrate 408 connecting the first electrical interface 404 to the deformable sensing medium 402 and the second electrical interface 406 to the deformable sensing medium 402. In other examples, the substrate 408 may be non-conductive, and the deformable sensing medium 402 may be directly coupled to the electrical connections 410, 412, or connected to the electrical interfaces 404, 406 via another medium, such as conductive wires.

The electrical connections 410, 412 will now be discussed in greater detail. As discussed above, the electrical connections 410, 412 may provide an electrical connection between the electrical interfaces 404, 406 and a controller. Examples of the electrical connections 410, 412 may include conductive wires. In these examples, the electrical connections 410, 412 may be constructed to accommodate fluctuations and/or more dramatic changes in a physical distance between the electrical interfaces 404, 406 and the controller. For example, as the substrate 408 is stretched, a distance between the electrical interfaces 404, 406 and the controller may increase. Accordingly, where the electrical connections 410, 412 are implemented as wires, the wires may be long enough to accommodate a maximum distance between the electrical interfaces 404, 406 and the controller. For example, the wires may be constructed in a zig-zagging configuration to accommodate stretching and contraction of the electrical connections 410, 412.

In other examples, the electrical connections 410, 412 may include other conductive media. For example, the electrical connections 410, 412 may include a conductive ink applied between the electrical interfaces 404, 406 and the controller. For example, the conductive ink may be applied to a substrate such as the substrate 312. In this example, the conductive ink path may be affected by stretching of the substrate 312 upon which the conductive ink is applied, but an electrical connection between the electrical interfaces 404, 406 and the controller may nonetheless be maintained. In still other examples, the electrical connections 410, 412 and the electrical interfaces 404, 406 may be electrically coupled via stretchable traces embedded in stretchable fabric.

Figure 5:
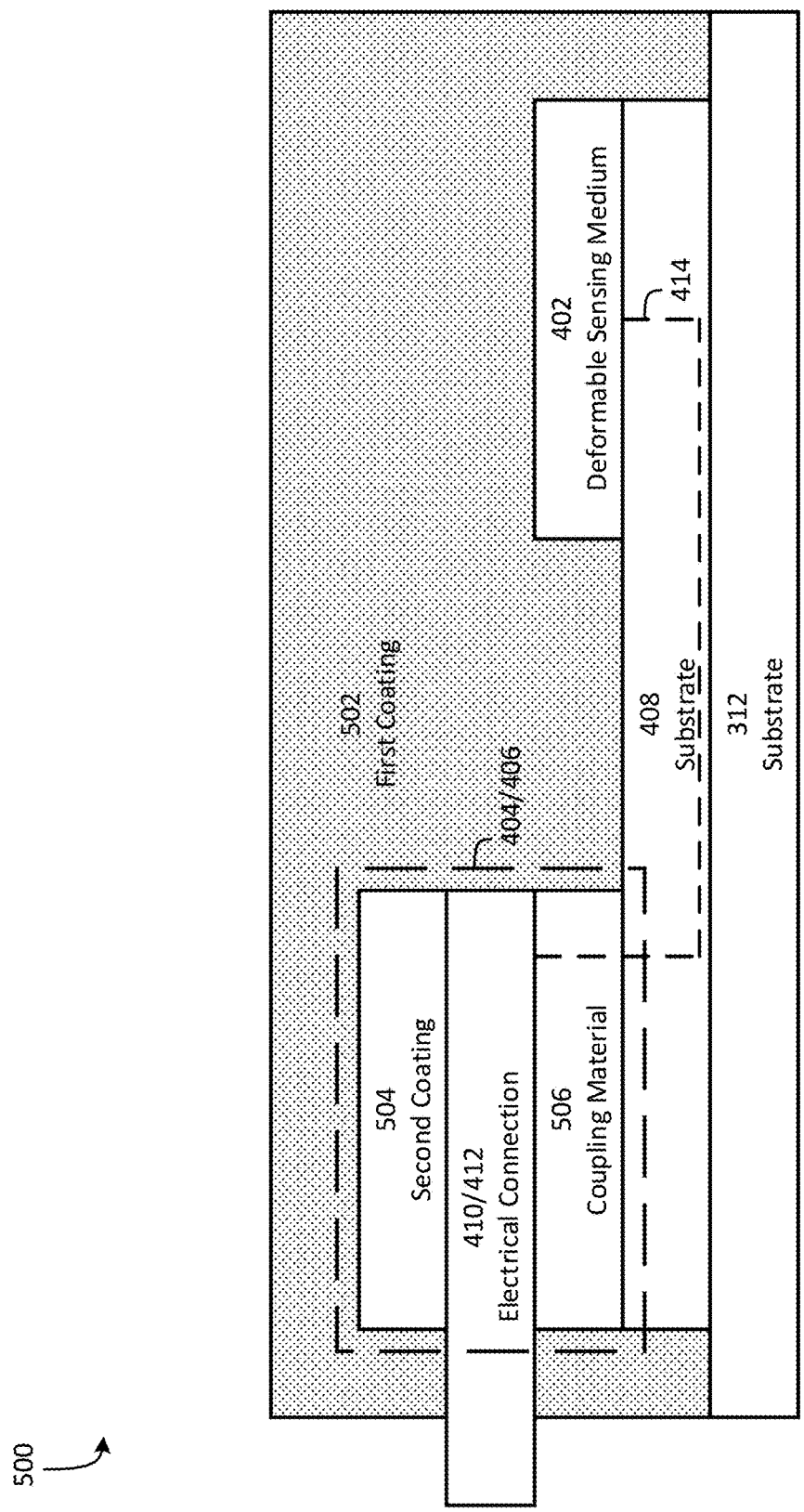
FIG. 5 illustrates a schematic diagram of the first sensing unit from a side view according to an example.

FIG. 5 illustrates a side schematic view of a sensing unit 500 according to an example. The sensing unit 500 may include one example of the sensing unit 400 as seen along axis A of FIG. 4. It is to be appreciated that aspects of the sensing unit 500 are not intended to be drawn to scale either individually or relative to other aspects of the sensing unit 500, and that the sensing unit 500 is illustrated for purposes of explanation only. Other examples of the sensing unit 400 may be implemented differently.

In the example illustrated in FIG. 5, the sensing unit 500 includes the substrate 312, the deformable sensing medium 402, one or both of the electrical interfaces 404, 406, the substrate 408, one or both of the electrical connections 410, 412, a first coating 502, a second coating 504, and a coupling material 506. The sensing unit 500 further illustrates the conductive path 414.

As discussed above, the electrical interfaces 404, 406 provide a coupling interface between the electrical connections 410, 412 and the deformable sensing medium 402 via the substrate 408. The electrical interfaces 404, 406 include a coupling material 506 and a second coating 504 to facilitate the coupling of the electrical connections 410, 412 to the substrate 408. In one example, the coupling material 506 enables a physical and electrical connection between the electrical connections 410, 412 and the substrate 408. For example, the coupling material 506 may include a conductive resin or adhesive, such as a conductive epoxy.

As discussed in greater detail below with respect to FIG. 6, the coupling material 506 may be applied to the substrate 408, and the electrical connections 410, 412 may be subsequently coupled to the coupling material 506. For example, where the electrical connections 410, 412 include physical media such as wires, the coupling material 506 may be applied to the substrate 408 and the electrical connections 410, 412 may be inserted into, placed on, or otherwise physically coupled to the coupling material 506 to establish a physical connection. At a subsequent point in time, the coupling material 506 may be cured to fix, strengthen, or otherwise make permanent the physical connection.

Subsequent to or concurrently with coupling the electrical connections 410, 412 and the coupling material 506, the second coating 504 may be applied to or around the electrical connections 410, 412. The second coating 504 may provide additional physical structure to the connection between the electrical connections 410, 412 and the coupling material 506. For example, the second coating 504 may include an adhesive such as a hot-melt film. The second coating 504 may encapsulate or otherwise cover the electrical connections 410, 412 to prevent or mitigate physical decoupling of the electrical connections 410, 412 from the coupling material 506.

Subsequent to or concurrently with coupling the electrical connections 410, 412 and the second coating 504, the first coating 502 may be applied to or around the sensing unit 500. As discussed above, the substrate 312 may include a stretchable substrate. In one example, the substrate 312 may include silicone. For example, the substrate 312 may include a soft (for example, having a Shore hardness of OO20) silicone capable of stretching responsive to user gestures or motions.

The first coating 502 may include a similar material. For example, the first coating 502 may include a silicone that is stiffer (for example, having a Shore hardness of A20) than the substrate 312. The first coating 502 may, by encapsulating or otherwise covering some or all of the other components of the sensing unit 500, provide additional physical structure to the sensing unit 500. For example, the first coating 502 may, by encapsulating or otherwise coating some or all of the electrical interfaces 404, 406, reduce physical stresses on the electrical interfaces 404, 406.

Reducing these physical stresses may mitigate a likelihood of the electrical connections 410, 412 becoming inadvertently decoupled from the substrate 408.

In some examples, the first coating 502 may also prevent unnecessary substances or particles from contacting portions of the sensing unit 500. For example, the first coating 502 may prevent dust or other detritus from contacting portions of the sensing unit 500, such as the electrical interfaces 404, 406. Furthermore, in some examples, the substrate 312 may provide a material that is unnecessary for operation of the sensing unit 500. For example, the substrate 312 may excrete oils, such as silicone oils, that may interfere with proper operation of components of the sensing unit 500, such as the electrical interfaces 404, 406. The first coating 502 may therefore provide a physical barrier between the substrate 312 and other portions of the sensing unit 500, including the electrical interfaces 404, 406.

Where two or more of the sensing units 304 include the sensing unit 500, each of the sensing units 500 may include a respective first coating 502, which covers the components 402-408. For example, each respective first coating 502 may extend across the components 402-408 and terminate after the substrate 408.

Figure 6:
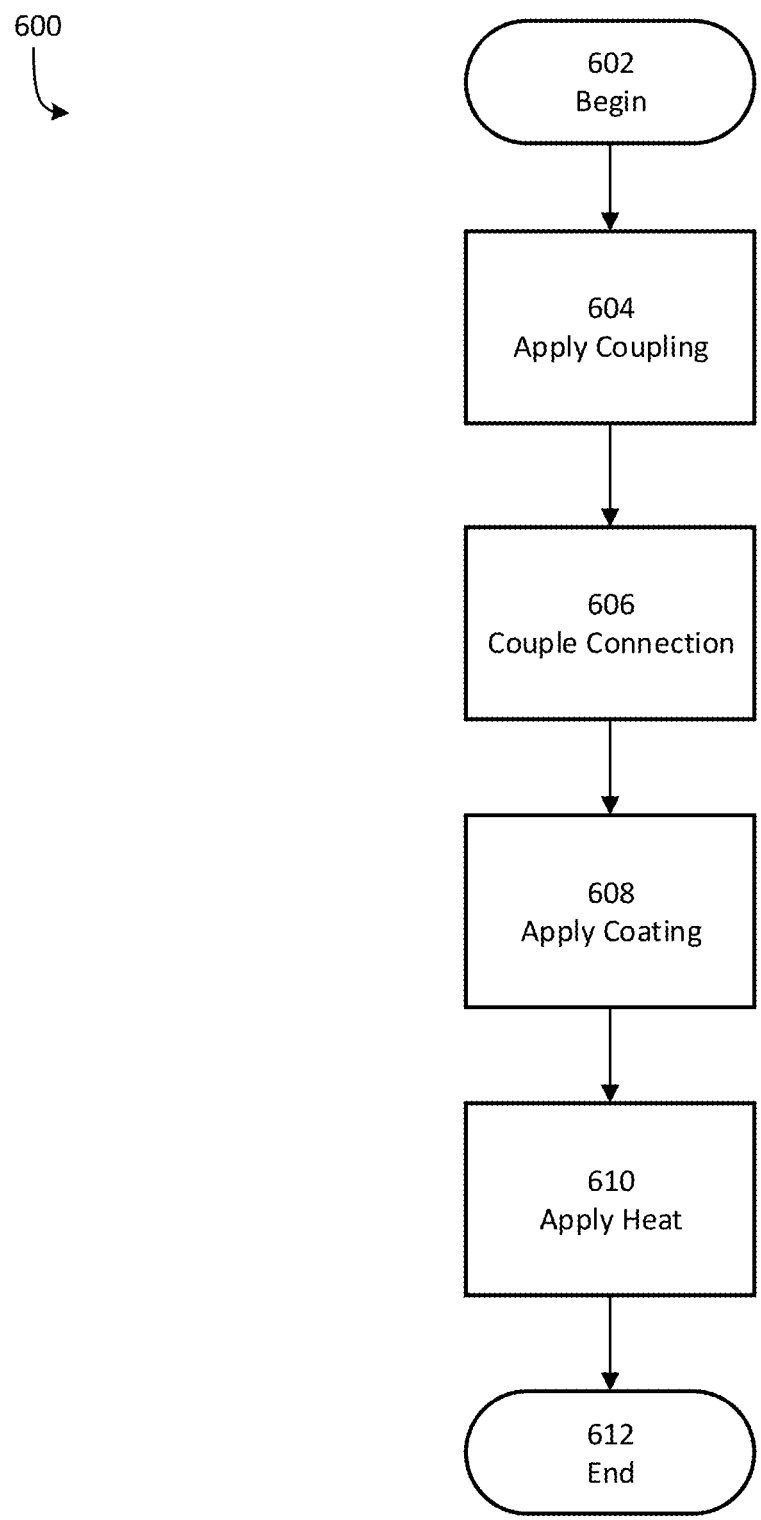
FIG. 6 illustrates a process of coupling an electrical connection to a sensing unit according to an example.

FIG. 6 illustrates a process 600 of coupling an electrical connection to a sensing unit according to an example. For example, the process 600 may illustrate a process of coupling the electrical connections 410, 412 to the substrate 408 using the coupling material 506 and the second coating 504. In this example, reference is made to the first electrical connection 410 of the first electrical interface 404 for purposes of explanation only. Similar principles may apply to the second electrical connection 412 of the second electrical interface 406.

At act 602, the process 600 begins. At act 604, the coupling material 506 is applied to the substrate 408. For example, the coupling material 506 may be a conductive epoxy that is placed on or otherwise applied to the substrate 408. In this example, the conductive epoxy may bridge a conductive gap between the first electrical connection 410 and the substrate 408 and thereby remove or mitigate disadvantageous artifacts in signals conducted between the first electrical connection 410 and the substrate 408 (for example, artifacts arising from unreliable electrical connections). In other examples, the coupling material 506 may include an alternative coupling material, such as conductive tape.

At act 606, the first electrical connection 410 is coupled to the coupling material 506. For example, the first electrical connection 410 may include a wire which may be inserted into or placed on the coupling material 506. The coupling material 506 may be at least somewhat adhesive such that a physical connection is established between the first electrical connection 410 and the coupling material 506 when the first electrical connection 410 is inserted into or placed on the coupling material 506.

At act 608, the second coating 504 is applied. For example, the second coating 504 may be applied on or around the first electrical connection 410 and the coupling material 506. The second coating 504 may, as discussed above, include a hot-melt film that provides additional physical structure to the connection between the first electrical connection 410 and the coupling material 506. In at least one example in which the second coating 504 includes a hot-melt film, the hot-melt film may be applied in a solid, rather than at least partially liquid, form, and subsequently be liquified by heat.

At act 610, heat is applied to the second coating 504 and the coupling material 506. For example, in examples in which the second coating 504 includes a hot-melt film and the coupling material 506 includes a conductive epoxy, the heat applied at act 610 may cure the conductive epoxy and cause the hot-melt film to melt. Melting the hot-melt film may at least partially liquify the hot-melt film such that the hot-melt film at least partially coats the first electrical connection 410 and/or the coupling material 506. The hot-melt film may also establish a physical connection to the substrate 408. For example, where the substrate 408 includes a fabric material as discussed herein, the hot-melt film may seep into the substrate 408 between the warp and weft of the substrate 408. In some examples, the hot-melt film may solidify after the heat is removed to provide the physical structure discussed above. At act 612, the process 600 ends.

A user input device capable of detecting user gestures and/or motions has been described. Although some examples have been provided, various examples are within the scope of this disclosure. For example, examples of the deformable sensing medium 402 have been provided in which the deformable sensing medium 402 includes a material capable of changing resistance in response to deformation of the deformable sensing medium 402. Various modifications may be made to the deformable sensing medium 402 to modify aspects of the deformable sensing medium 402.

For example, a shape and position of the deformable sensing medium 402 may be modified to adjust operation or properties thereof. A shape and position of the deformable sensing medium 402 may be modified to impact certain properties of the deformable sensing medium 402 including, for example, an amount of deformation resulting from stretching of the substrate 408. Furthermore, a shape and position of the deformable sensing medium 402 may impact an amount of a change in resistance of the deformable sensing medium 402 resulting from deformation of the deformable sensing medium 402. A shape and position of the deformable sensing medium 402 may also impact other properties of the sensing unit 400, such as a physical footprint of the sensing unit 400. Accordingly, a shape and/or position of the deformable sensing medium 402 may be varied to achieve various desired design parameters.

In one example, the deformable sensing medium 402 may be a rectangular prism having at least partially rounded edges. The deformable sensing medium 402 may include a malleable material capable of being shaped using certain molding techniques including, for example, compression molding or other molding techniques. The deformable sensing medium 402 may be coupled to the substrate 408 subsequent to formation. In some examples, the deformable sensing medium 402 may optionally be included in a frame. For example, the frame may extend around a circumference of the deformable sensing medium 402 to prevent the deformable sensing medium 402 from shifting, expanding, or otherwise creeping beyond an intended position. Although the frame may include one of various materials, in one example, the frame may include a viscoelastic material.

As discussed above, the substrate 408 may include a stretchable and conductive material. For example, the substrate 408 may include a conductive woven material. Woven materials may be advantageous at least because such materials enable better coupling with, and adhesion to, malleable materials such as the substrate 312, the deformable sensing medium 402, and the coupling material 506, as compared to examples in which the substrate 408 might be a smooth, non-woven material, such as copper pads.

Furthermore, the substrate 408 may be advantageously mechanically compliant. For example, the substrate 408 may be more compliant than comparable materials, such as copper pads of a similar thickness as the substrate 408. Compliance may be advantageous in reducing mechanical stresses between the substrate 408 and the substrate 312 and between the substrate 408 and the deformable sensing medium 402 as compared to comparable materials, such as copper films. Reducing mechanical stresses may be beneficial for various reasons including, for example, enhancing the robustness of the sensing unit 400. Additionally, the substrate 408 may be conducive to coupling with materials such as the first coating 502 to reduce a mechanical stress applied to the electrical interfaces 404, 406 by moving stretching regions of the user input device 300 away from the electrical interfaces 404, 406.

The user input device 300 may include any number of sensing units 304. For example, the user input device 300 may include a number of sensing units 304 that provides a sufficient amount of information to identify a desired number of gestures or motions. The sensing units 304 may be positioned regularly or irregularly on the user input device 300, and may have similar configurations to one another or different configurations. In some examples, the sensing units 304 may each be coupled to the controller 308 via the same medium 310. For example, each of the sensing units 304 may be coupled to the controller 308 via a respective pair of wires. In other examples, a subset of the sensing units 304 may be coupled to the controller 308 via a first medium (for example, a pair of wires) and another subset of the sensing units 304 may be coupled to the controller 308 via a second medium (for example, conductive ink). In yet another example, other connection schemes may be implemented, such as by daisy-chaining one or more of the sensing units 304 in series, such that one or more of the sensing units 304 provides information to the controller 308 indirectly via at least one of the other sensing units 304. In this connection scheme, at least one of, but fewer than all of, the sensing units 304 may be directly connected to the controller 308 to provide information derived from itself or another of the sensing units 304.

As discussed above, an example of the user input device 104 may include the user input device 300. Moreover, in some examples, the substrate 312 may include a stretchable material and the sensing units 304 may analyze stretching of the substrate 312 such that a user gesture may be determined. In other examples, an example of the user input device 104 may be configured differently, as discussed with respect to FIG. 7.

Figure 7:
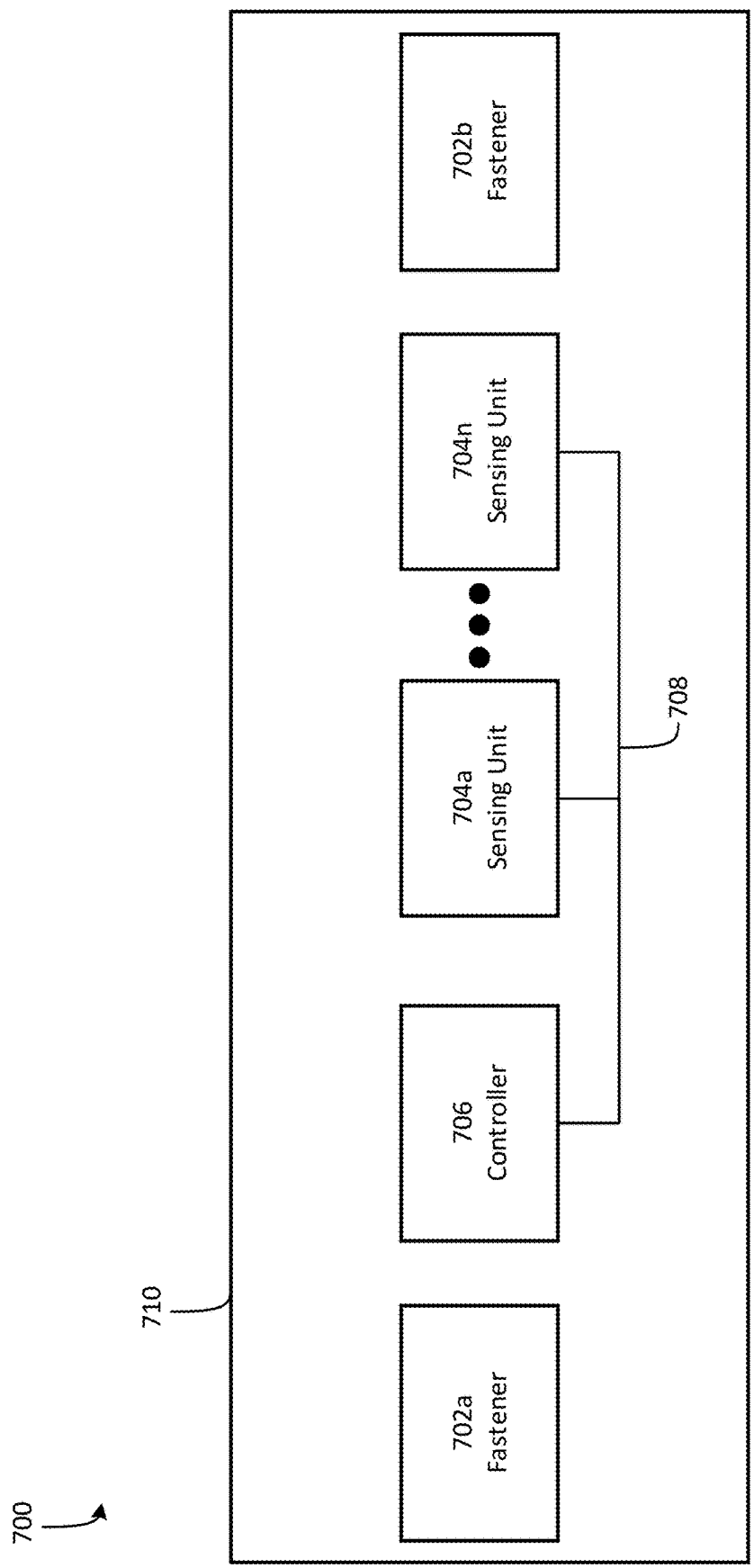
FIG. 7 illustrates a block diagram of a second user input device according to an example.

FIG. 7 illustrates a schematic diagram of a user input device 700 according to an example. The user input device 700 may determine gestures performed by a user. The user input device 700 includes fasteners 702, which include a fastener 702a and a fastener 702b, sensing units 704, which include sensing units 704a-704n, and a controller 706. The sensing units 704 are electrically and/or communicatively coupled to the controller 706 via a medium 708. The components 702-706 are mechanically coupled to a substrate 710.

In one example, the user input device 700 may be an example of the user input device 104. For example, fasteners 702 may be an example of, or included in, the fastener(s) 110. The sensing units 704 may be an example of, or included in, the sensor(s) 112. The controller 706 may be an example of, or included in, the controller(s) 114.

The user input device 700 may be configured to determine gestures performed by a user at least in part by sensing deformations in a surface of a user's skin resulting from gestures performed by the user. In one example, the substrate 710 is a non-stretchable band, and may be coupled around a user's wrist or forearm. The fasteners 702 may facilitate the coupling of the substrate 710 around the user's wrist or forearm. For example, the fasteners 702 may include hook-and-loop such that, when the substrate 710 is coupled around a user's wrist or forearm, the fastener 702a (which may include, for example, a "hook" material) and the fastener 702b (which may include, for example, a "loop" material) overlap and couple together.

The sensing units 704 may determine information indicative of user gestures as the user's skin is deformed by the user gestures, and provide the information to the controller 706 via the medium 708. For example, and as discussed in greater detail below with respect to FIG. 8, the sensing units 704 may include one or more sensors configured to determine a transient change in a deformation of a user's skin, and to determine a deformation level of the user's skin.

The controller 706 receives information from one or more of the sensing units 704 via the medium 708. Based on the information, the controller 706 determines a user gesture, determines a user input selection corresponding to the user gesture, and provides the user input selection to a controllable device. For example, the controller 706 may include a communication interface to enable control signals encoding the user input selection to be output to one or more controllable devices.

Figure 8:
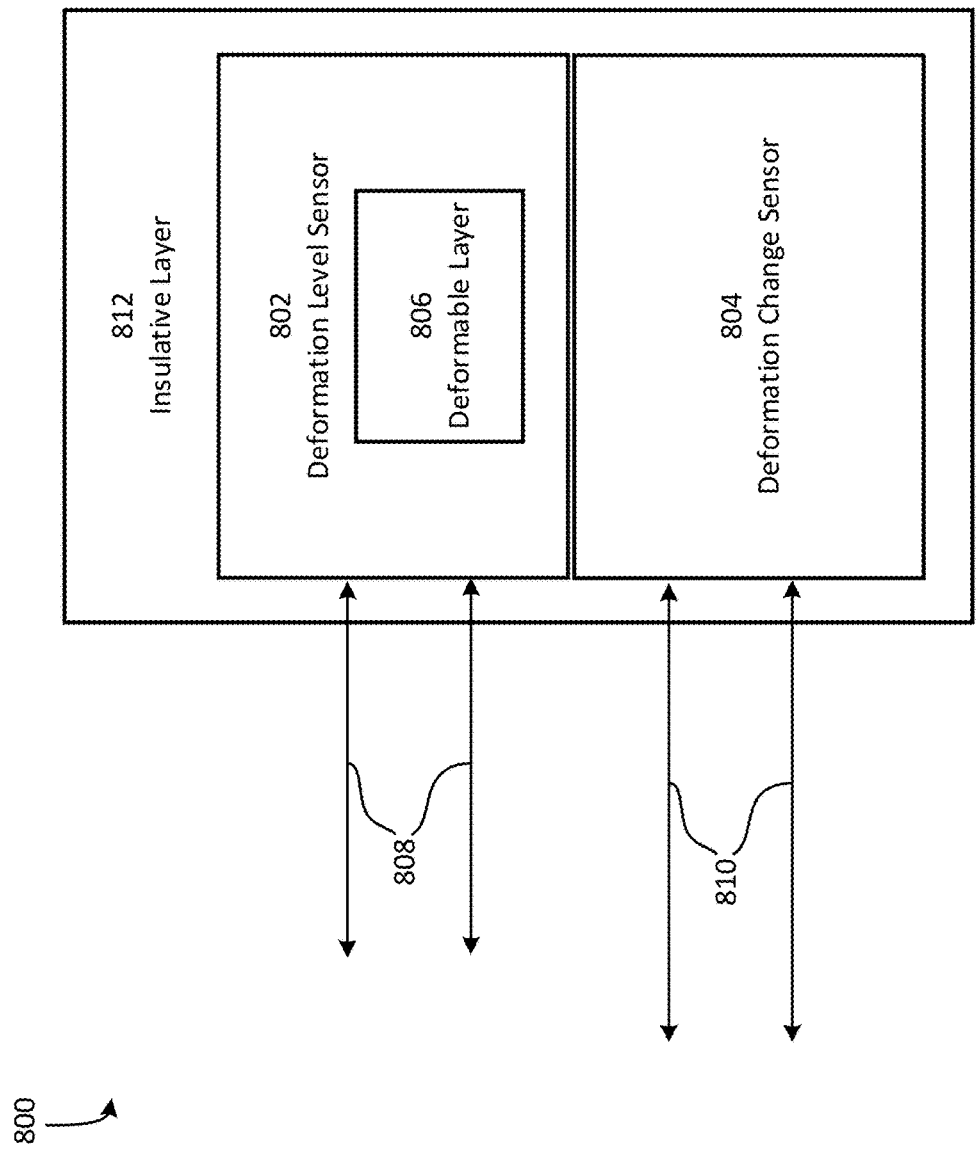
FIG. 8 illustrates a schematic diagram of a second sensing unit according to an example.

FIG. 8 illustrates a schematic diagram of a sensing unit 800 according to an example. For example, the sensing unit 800 may be included in an example of one or more of the sensing units 704. The sensing unit 800 includes a deformation level sensor 802 and a deformation change sensor 804. The deformation level sensor 802 includes a deformable layer 806. The deformation level sensor 802 is electrically coupled to electrical connections 808, which may be coupled to a controller such as the controller 706. The deformation change sensor 804 is electrically coupled to electrical connections 810, which may be coupled to a controller such as the controller 706. In some examples, the sensing unit 800 includes an electrically insulative layer 812 coupled to the deformation level sensor 802 and the deformation change sensor 804.

In one example, the deformation level sensor 802 is configured to detect a level of deformation of a user's skin, and the deformation change sensor 804 is configured to detect a change in deformation of a user's skin. That is, in this example, the deformation change sensor 804 measures a transient change in deformation of a user's skin rather than an amount of the deformation.

Figure 9:
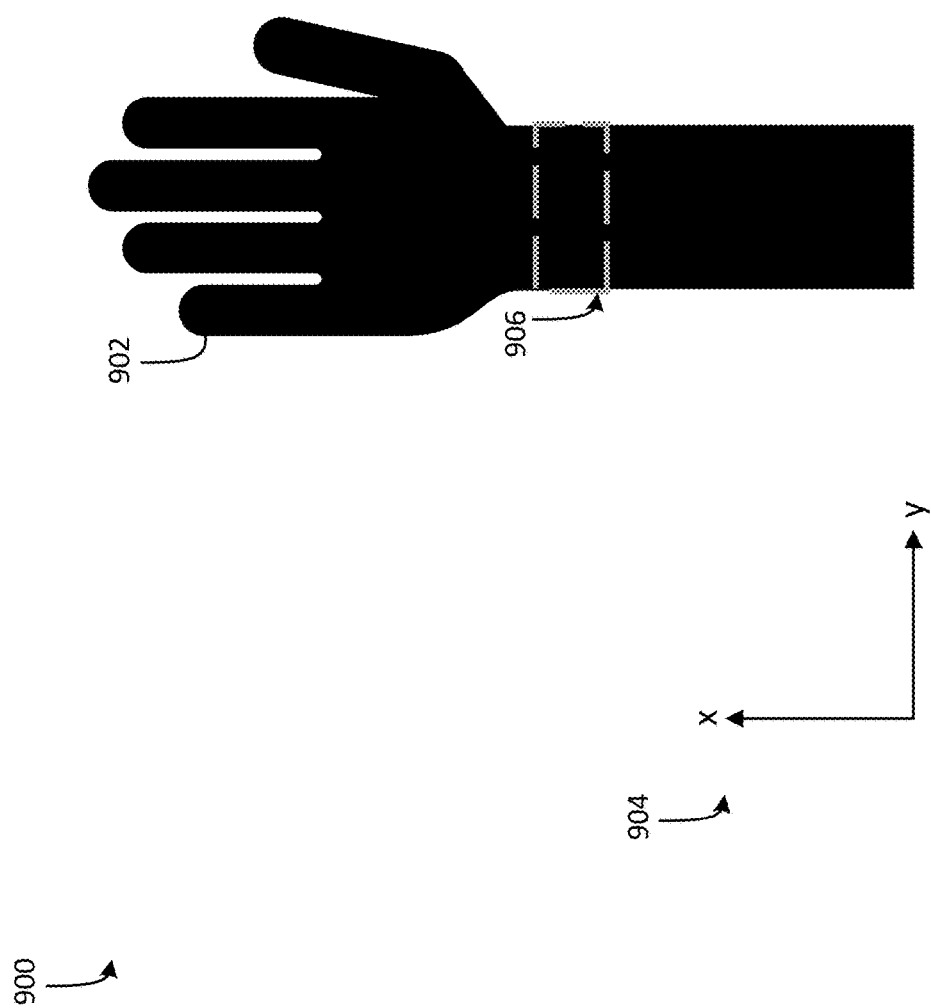
FIG. 9 illustrates a schematic view of a coordinate system according to an example.

The sensors 802, 804 may be co-located. For example, FIG. 9 illustrates a view of a coordinate system 900 including a representation of a user's arm 902 and a coordinate axis 904 indicating an x axis and a y axis, where the user's arm 902 extends longitudinally about the y axis. The user input device 700, including examples in which the sensing units 704 include the sensing unit 800, may be coupled around or near a user's wrist 906.

In various examples, in each of the sensing units 704 including the sensing unit 800, the deformation level sensor 802 and the deformation change sensor 804 may be located at the same or approximately the same location along the x axis. The deformation level sensor 802 and the deformation change sensor 804 may be offset along the y axis to approximately the extent necessary to prevent overlapping of the sensors 802, 804. That is, in this example, the sensors 802, 804 are co-located inasmuch as they are located at approximately the same location along the x axis and are directly adjacent along the y axis. As used herein, "directly adjacent" refers to a configuration in which no or a minimal amount of space exists between two entities in at least one dimension (for example, in the y dimension). In other examples, the sensors 802, 804 may be considered co-located if the sensors 802, 804 are located sufficiently closely together that a particular physical change resulting from a user gesture (for example, a particular muscle or tendon moving under the user's skin) can be detected by both of the sensors 802, 804.

Figure 10:
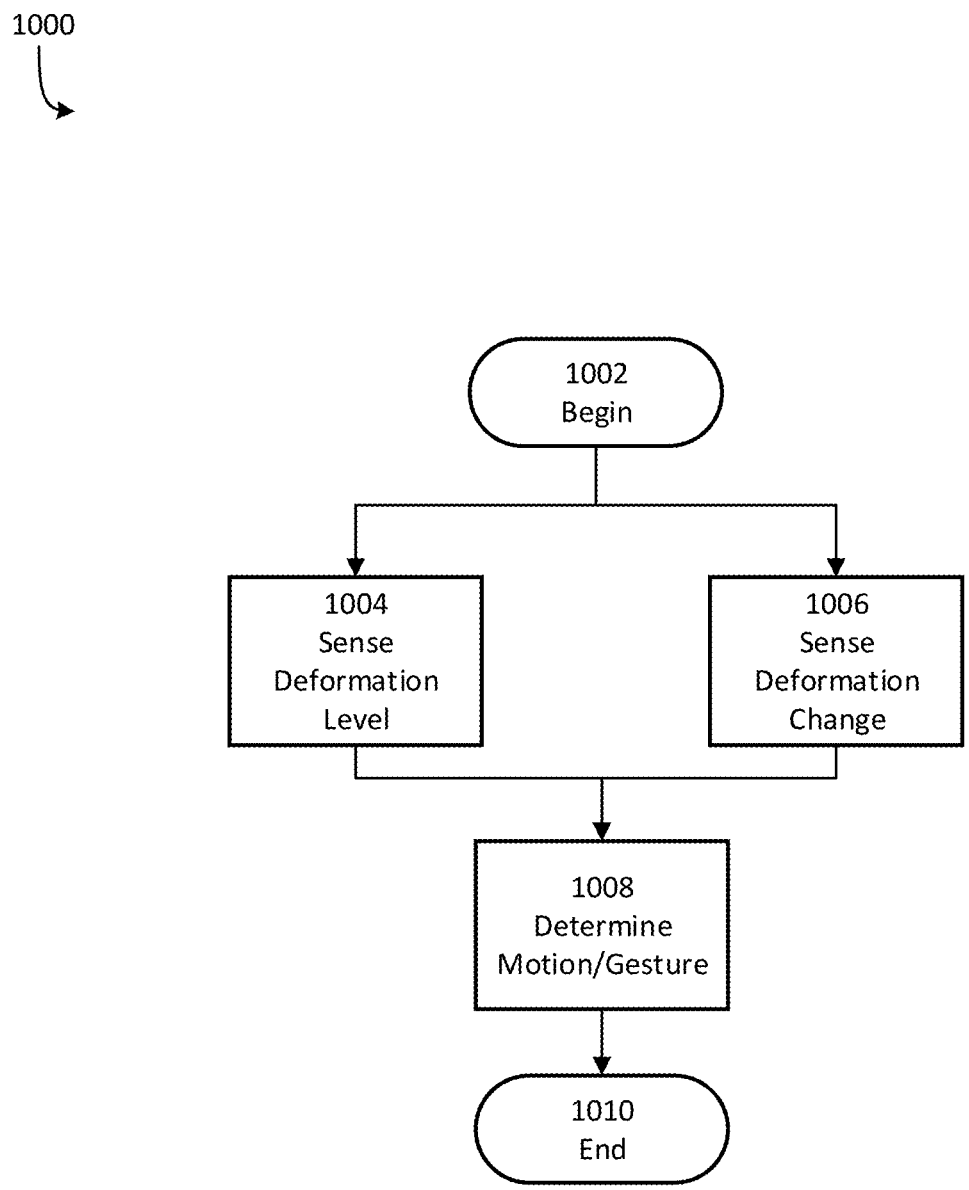
FIG. 10 illustrates a process of determining a user gesture according to an example.

FIG. 10 illustrates a process 1000 of implementing the sensing unit 800 according to an example. An example is provided in which the sensing unit 800 is included in at least one of the sensing units 704. At act 1002, the process 1000 begins. At act 1004, the deformation level sensor 802 senses a change in a deformation level in a user's skin resulting from a user gesture. As discussed in greater detail below, the deformation level sensor 802 may sense a magnitude of a normal force from a user's skin (that is, a force having a direction normal to a surface of the user's skin) and may thus sense an amount by which a normal force changes. The deformation level sensor 802 may provide information indicative of the sensed changes in the deformation level to the controller 706. For example, the deformation level sensor 802 may provide the information to the controller 706 via the electrical connections 808.

At act 1006, the deformation change sensor 804 senses a deformation change in the user's skin resulting from a user gesture. Act 1006 may occur prior to, simultaneously with, or after act 1004. The deformation change sensor 804 may sense a transient change in deformation rather than sensing a deformation level directly. The deformation change sensor 804 may provide information indicative of the sensed deformation changes to the controller 706. For example, the deformation change sensor 804 may provide the information to the controller 706 via the electrical connections 810.

At act 1008, a gesture or motion is determined. The controller 706 may determine the gesture or motion based on the information provided by the sensors 802, 804. For example, the controller 706 may be configured to identify, based on the received information, which motion or gesture of a set of motions or gestures the received information is most likely to correspond to. The controller 706 may be advantageously capable of determining motions or gestured based on the information received from both of the sensors 802, 804 at least because the sensors 802, 804 are co-located, and thus may sense the same or similar changes resulting from a gesture. For example, changes in the position of a particular tendon moving at a specific spot on the user's wrist may be sensed by both of the sensors 802, 804 at least because the sensors 802, 804 are co-located where the physical changes occur.

Accordingly, where the sensors 802, 804 are co-located, the controller 706 may have various types of information with which to determine a gesture or motion. As discussed above, information provided by the deformation change sensor 804 may be indicative of the presence of a deformation change, and information provided by the deformation level sensor 802 may be indicative of the magnitude of a change. The controller 706 is therefore capable of more accurately identifying gestures or motions at least because the controller 706 has access to various types of information indicative of the physical changes resulting from a user performing a gesture or motion. The identified gesture or motion may subsequently be used, by the controller 706, to control a controllable device as discussed above with respect to acts 208-212 of the process 200. At act 1010, the process 1000 ends.

The deformation level sensor 802 and the deformation change sensor 804 will now be discussed in greater detail. In one example, the deformation level sensor 802 is configured to measure a deformation of a user's skin, and provide information indicative of the deformation of the user's skin to the controller 706 via the electrical connections 808. For example, the deformation level sensor 802 may be configured to measure a normal force exerted normal to a surface of a user's skin. The deformation level sensor 802 may be a sensor configured to change in resistance based on a magnitude of a force exerted on the deformation level sensor 802. In some examples in which the user input device 700 encircles a user's wrist, the sensors 802, 804 may be implemented on a side of the substrate 710 that faces or contacts a user's wrist.

Thus, the deformation level sensor 802 changes in resistance based on a magnitude of a force exerted normal to a surface of a user's skin. For example, as a user performs gestures, a surface of the user's skin that is adjacent to the deformation level sensor 802 may move towards or away from the deformation level sensor 802, thereby exerting a varying normal force on the deformation level sensor 802. Levels of deformation in or on a user's skin may therefore be sensed by the deformation level sensor 802.

In one example, the deformation level sensor 802 includes a force-sensing resistor (FSR). An FSR includes a material that changes in resistance in response to the application of a force. Thus, if the user performs a gesture that causes a surface of the user's skin to move closer to the deformation level sensor 802, an increased normal force is applied to the deformation level sensor 802 and a resistance thereof may increase or decrease in response. A resistance of the deformation level sensor 802 may correspond to a magnitude of the normal force applied.

In some examples, a normal force must be applied to the deformation level sensor 802 in order for the deformation level sensor 802 to sense the normal force. Thus, to increase an amount of time during which the deformation level sensor 802 is capable of sensing the normal force, it may be advantageous to maximize an amount of time that the deformation level sensor 802 contacts, either directly or indirectly, a surface of the user's skin. To maximize an amount of time that the deformation level sensor 802 contacts a surface of the user's skin, the deformation level sensor 802 should be capable of sensing changes in the surface of the user's skin for all or most ranges in distance between the deformation level sensor 802 and the surface of the user's skin, including a largest distance between the deformation level sensor 802 and the user's skin.

However, user comfort may be detrimentally impacted in examples in which the deformation level sensor 802 directly contacts a user's skin. The deformation level sensor 802 may include a relatively non-deformable material and may apply a relatively large amount of pressure on a user's skin, particularly where a distance between the user's skin and the deformation level sensor 802 is smallest. More particularly, in these examples, the deformation level sensor 802 may apply a relatively large amount of pressure to maximize mechanical coupling between the deformation level sensor 802 and the user's skin and thereby increase the robustness of measurements by the deformation level sensor 802. However, if an amount of pressure applied by the deformation level sensor 802 is reduced (for example, by moving the deformation level sensor 802 farther away from the user's skin), then an ability of the deformation level sensor 802 to maintain contact with the user's skin at larger distances may be reduced. Thus, in some examples a trade-off disadvantageously exists between user comfort and a robustness of measurements by certain deformation level sensors.

In some examples, the deformation level sensor 802 is coupled to the deformable layer 806. The deformable layer 806 may at least partially cover portions of the deformation level sensor 802 that contact a user's skin, and may include a soft and/or deformable material. For example, the deformable layer 806 may include silicone. The deformable layer 806 may extend outwards from the deformation level sensor 802 such that, when a user input device including the sensing unit 800 is implemented, the deformable layer 806 is pressed into a user's skin. The deformable layer 806 may increase a concavity of a user's skin (that is, indents the skin of the user) at an interface between the deformable layer 806 and the user's skin (that is, an area at which the deformable layer 806 contacts the user's skin). The interface may be increased relative to an interface between a user's skin and the deformation level sensor 802 without the deformable layer 806 at least because the deformable layer 806, being pressed into the user's skin and thereby increasing a concavity of the user's skin at the interface, contacts the user's skin with an increased surface area and increases a force applied to the deformation level sensor 802 by a user gesture.

The deformable layer 806 may provide at least two advantages. A first advantage includes improved user comfort. As discussed above, in certain deformation level sensors, a trade-off may exist between user comfort and a robustness of measurements. Implementation of the deformable layer 806 enhances user comfort and a robustness of measurements at least in part by including a soft and/or deformable material that decreases an amount of pressure applied to a user's skin. A second advantage includes increasing an ability of the deformation level sensor 802 to sense changes in a user's skin. As discussed above, the deformable layer 806 may interface with the user's skin with an increased surface area relative to the deformation level sensor 802, such that the deformation level sensor 802 is more sensitive to changes in the user's skin (that is, by increasing an amount and/or duration of mechanical coupling with the user's skin). Thus, in various examples the deformable layer 806 may advantageously enhance user comfort and an ability of the deformation level sensor 802 to sense changes in a user's skin.

In one example, the deformation change sensor 804 is configured to detect a change in a deformation of a user's skin, and provide information indicative of the detected change to the controller 706 via the electrical connections 810. That is, the deformation change sensor 804 is configured to detect transient changes in the deformation of a user's skin, rather than an actual amount of deformation of the user's skin.

Deformation change information may be implemented to parse out separate movements associated with gestures or motions. For example, the controller 706 may determine that each change detected by the deformation change sensor 804 corresponds to a change in user's body. Thus, by way of example, the deformation change sensor 804 may detect a single deformation change where a user performs a gesture in which a thumb and little finger are pressed together, whereas the deformation change sensor 804 may detect at least two deformation changes where the user performs a gesture in which a thumb and little finger are tapped together twice in rapid succession. The controller 706 may therefore parse out a number of movements which may be analyzed in conjunction with deformation level information to determine a gesture or motion corresponding to the parsed movements, which may be particularly advantageous for small gestures or motions that do not produce a significant deformation level change.

The deformation change sensor 804 may include materials sensitive to transient changes in applied pressure. In one example, the deformation change sensor 804 includes a piezoelectric material that generates a signal responsive to a change in pressure applied by a user's skin. For example, the deformation change sensor 804 may include a piezoelectric film, such as a piezoelectric polyvinyl difluoride (PVDF) film. The PVDF film may generate an electrical signal (for example, a current signal) responsive to a change in mechanical stress applied to the PVDF film by the user's skin, which may be provided to the controller 706 as discussed above.

Figure 11:
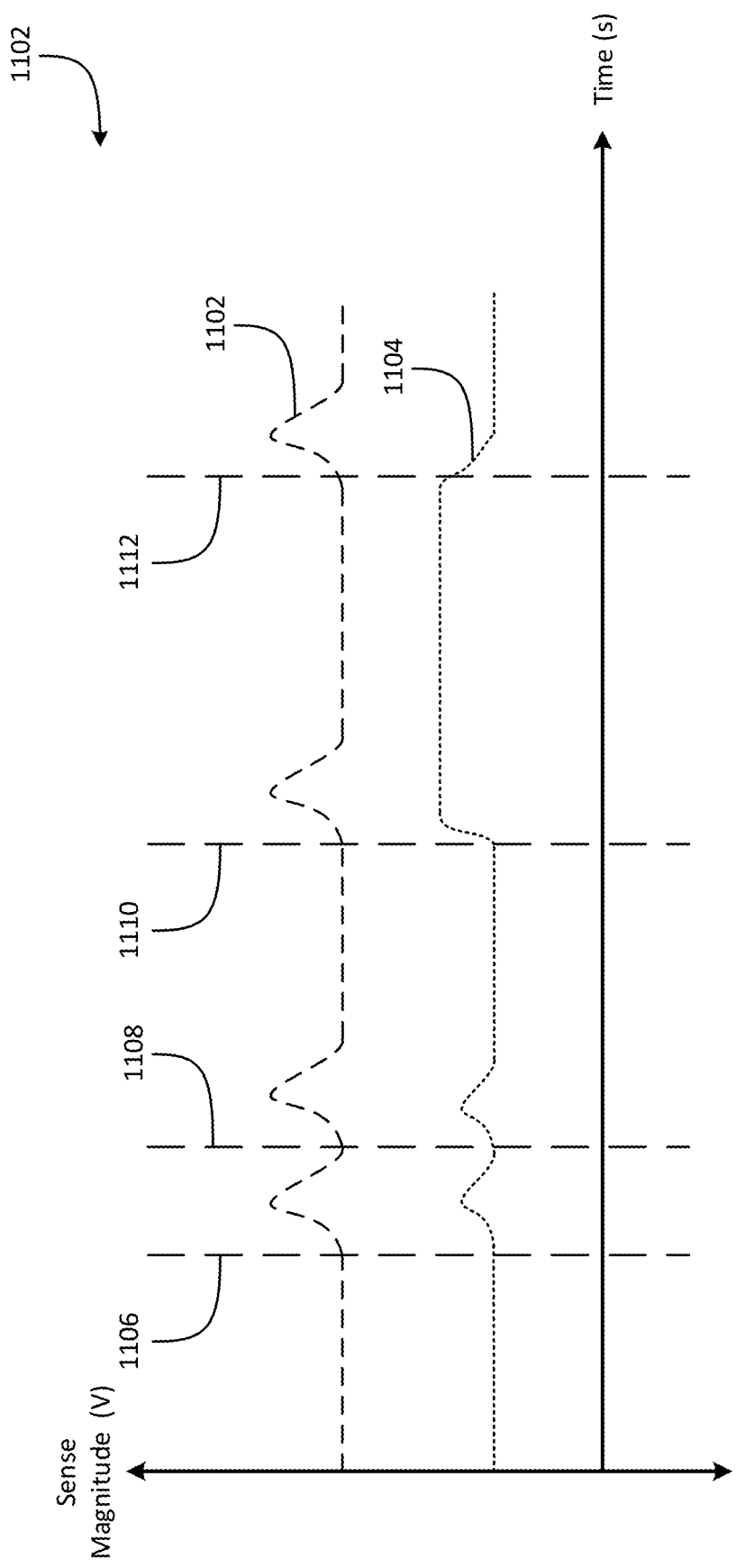
FIG. 11 illustrates a graph of sensing signals according to an example.

An example of operation of the sensors 802, 804 is provided for purposes of explanation. FIG. 11 illustrates a graph 1100 indicative of operation of the sensors 802, 804 according to an example. The graph 1100 includes an x-axis corresponding to an elapsed time and a y-axis corresponding to a signal magnitude. The graph 1100 includes a deformation change trace 1102 provided by the deformation change sensor 804 and a deformation level trace 1104 provided by the deformation level sensor 802. The graph 1100 illustrates changes in the traces 1102, 1104 at various times, including a first time 1106, a second time 1108, a third time 1110, and a fourth time 1112, each of which is described below.

In the time leading to the first time 1106, the traces 1102, 1104 are at a steady state. The traces 1102, 1104 being in a steady state may indicate a lack of changes in a user's skin, which may, in turn, indicate a lack of changes in a user performing a gesture. At the first time 1106, the traces 1102, 1104 increase in signal magnitude. As discussed in greater detail below, the first time 1106 may indicate the beginning of a user touching a thumb and little finger together in rapid succession.

The deformation change trace 1102 increasing may indicate that there is a change in a deformation level of a user's skin as sensed by the deformation change sensor 804. The deformation change trace 1102 decreases in magnitude back to the steady state shortly thereafter, indicating that the deformation level of the user's skin is no longer changing. The deformation level trace 1104 increasing may indicate an increase in force applied to the deformation level sensor 802. For example, the user's skin may move closer to the deformation level sensor 802, thereby increasing the force applied to the deformation level sensor 802. The deformation level trace 1104 decreases in magnitude back to the steady state shortly thereafter, indicating that the force applied to the deformation level sensor 802 is commensurately decreasing back to an original state (i.e., a state before the first time 1106).

At the second time 1108, the traces 1102, 1104 again increase and decrease in a similar, or substantially identical, manner as at the first time 1106. The similarity in the behavior of the traces 1102, 1104 may indicate that a substantially identical gesture was performed beginning at the first time 1106 and the second time 1108. The controller 706, upon receiving the signals generated by the sensors 802, 804, may subsequently determine that a user performed a gesture in which the user pressed a thumb and little finger together twice in rapid succession. For example, the controller 706 may determine that the user performed two movements in rapid succession based on the two successive crests in the signal magnitude of the deformation change trace 1102, and may determine that the two movements included pressing a thumb and little finger together based on the magnitude of the deformation level trace 1104.

At the third time 1110, the deformation change trace 1102 again increases and subsequently decreases, indicating a change in deformation of a user's skin resulting from a user gesture. The deformation level trace 1104 increases to a higher magnitude value, and remains at the higher magnitude value for a longer period of time than after the first time 1106 and the second time 1108. The deformation level trace 1104 remains at the higher magnitude value until the fourth time 1112.

At the fourth time 1112, the deformation level trace 1104 decreases back to the steady state. The deformation change trace 1102 increases and subsequently decreases in response to a change in deformation level of the user's skin. The controller 706, upon receiving the signals generated by the sensors 802, 804, may subsequently determine that a user performed a gesture in which the user pressed and held a thumb and little finger together for an extended period of time (that is, a period of time between the third time 1110 and the fourth time 1112). For example, the controller 706 may determine that the user performed one gesture based on the single crest in the signal magnitude of the deformation change trace 1102 until the fourth time 1112, at which point the increase in the deformation change trace 1102 is interpreted as an end of the gesture. The controller 706 may determine that the single gesture included pressing a thumb and little finger together based on the magnitude of the deformation level trace 1104, which persistently remained at a high signal level for the duration of the gesture.

As discussed above, the sensing unit 800 may include an electrically insulative layer 812 coupled to the deformation level sensor 802 and the deformation change sensor 804. The electrically insulative layer 812 may include a material configured to prevent direct contact between the deformation change sensor 804 and the user's skin, and may be further configured to prevent substances that are unnecessary for proper operation of the sensors 802, 804 (for example, sweat, water, and so forth) from contacting the sensors 802, 804. For example, the electrically insulative layer 812 may include a thin, electrically insulative material such as a fabric material, an elastomer material, or another electrically insulative material.

Although the electrically insulative layer 812 is illustrated as a single entity, in other examples, the electrically insulative layer 812 may include several entities. For example, the electrically insulative layer 812 may include a first electrically insulative material coupled to the deformation level sensor 802, and a second electrically insulative material coupled to the deformation change sensor 804. In these examples, the first and second materials may be the same type of material, or may be different types of materials. Moreover, in these examples, the first and second materials may or may not at least partially overlap one another.

Accordingly, it is to be appreciated that signals generated by co-located sensors 802, 804 may be analyzed (for example, by the controller 706) to determine a gesture performed by a user. Signals generated by the deformation change sensor 804 may be used to determine a number of separate movements performed by a user, and signals generated by the deformation level sensor 802 may be used to determine a type of the movements performed by the user. Collectively, at least one gesture performed by the user may be determined based on the signals provided by the deformation change sensor 804 and the deformation level sensor 802.

In some examples, some or all of the sensing units 704 may include the co-located sensors 802, 804, and some or all of the sensing units 704 may include only one of the sensors 802, 804. For example, one or more of the sensing units 704 may include only the deformation level sensor 802, one or more of the sensing units 704 may include only the deformation change sensor 804, and one or more of the sensing units 704 may include both of the sensors 802, 804.

As discussed above, the deformation level sensor 802 may determine a magnitude of deformation of a user's skin. For example, the deformation level sensor 802 may include an FSR configured to determine a normal force applied to the FSR by a user's skin. In other examples, the deformation level sensor 802 may include a different type of sensor or sensors capable of determining an amount of deformation of a surface or a magnitude of a force applied by a surface.

The deformation level sensor 802 may include the deformable layer 806 to enhance user comfort and increase interfacing between the deformation level sensor 802 and a user's skin. For example, increasing interfacing between the deformation level sensor 802 and a user's skin may include increasing a surface area of a user's skin for which deformation may be sensed by the deformation level sensor 802, and increasing an amount of force applied to the deformation level sensor 802 by a user gesture. In some examples, a user input device 700 may be implemented in which all of the sensing units 704 including deformation level sensors 802 include the deformable layer 806. In other examples, some of the sensing units 704 including deformation level sensors 802 may include the deformable layer 806, and others may not.

The deformation change sensor 804 may determine a change in a deformation of a user's skin. For example, the deformation change sensor 804 may determine transient changes in the deformation of a user's skin. In some examples, the deformation change sensor 804 includes a piezoelectric material or film, such as PVDF film. In other examples, the deformation change sensor 804 may include a different type of sensor or sensors capable of identifying transient changes in deformation of a user's skin.

The user input device 700 may include any number of sensing units 704. For example, the user input device 700 may include a number of sensing units 704 that provides a sufficient amount of information to identify a desired number of gestures or motions. The sensing units 704 may be positioned regularly or irregularly on the user input device 700, and may have similar configurations to one another or different configurations. In some examples, the sensing units 704 may each be coupled to the controller 706 via the same medium 708. For example, each of the sensing units 704 may be coupled to the controller 706 via a respective pair of wires. In other examples, a subset of the sensing units 704 may be coupled to the controller 706 via a first medium (for example, a pair of wires) and another subset of the sensing units 704 may be coupled to the controller 706 via a second medium (for example, conductive ink).

It is to be appreciated that devices disclosed herein (including, for example, the devices 104, 300, and 700) may detect user input motions and/or gestures. In some examples, certain devices, including the devices disclosed above, may be capable of determining user input motions and/or gestures in addition to other information. For example, certain devices may be capable of determining user biological information. User biological information may include, for example, a user's heart activity (for example, heart rate, pulse strength, or other information indicative of activity of a user's heart), a user's blood pressure, and other information indicative of a user's biological processes.

As discussed in greater detail below, examples of devices disclosed above, including the devices 104, 300, and 700, may be configured to detect user input motions and/or gestures in addition to user biological information. In additional examples discussed below, alternate devices are described which are capable of determining user biological information. Accordingly, and as described in greater detail below, it is to be appreciated that devices described above and devices described below are capable of determining information including user biological information in addition to or in lieu of user gestures and/or motions.

Figure 12:
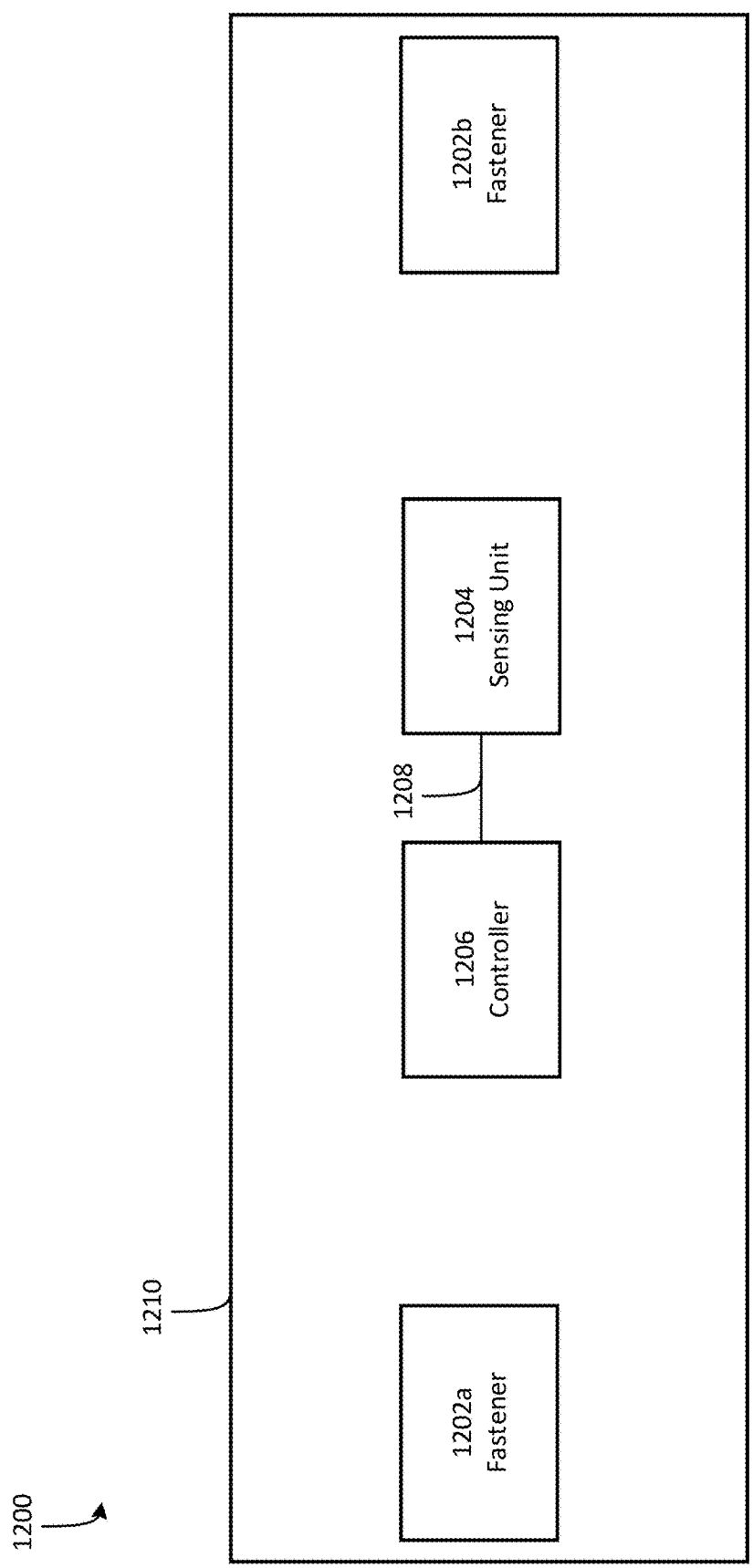
FIG. 12 illustrates a block diagram of a sensing device according to an example.

FIG. 12 illustrates a schematic diagram of a sensing device 1200 according to an example. The sensing device 1200 may be configured to determine biological information of a user. For purposes of illustration, examples are provided in which the biological information includes a heart rate of a user. In other examples, the biological information may include information other than the heart rate of the user, such as a user's blood pressure. The sensing device 1200 includes fasteners 1202, which may include a fastener 1202a and a fastener 1202b, a sensing unit 1204, and a controller 1206. The sensing unit 1204 is electrically and/or communicatively coupled to the controller 1206 via a medium 1208. The components 1202-1208 are mechanically coupled to a substrate 1210.

In one example, certain components of the sensing device 1200 may be similar to those of the user input device 104. For example, fasteners 1202 may be an example of, or may be similar to, the fastener(s) 110. The sensing unit 1204 may be an example of, or may be similar to, the sensor(s) 112. The controller 1206 may be an example of, or may be similar to, the controller(s) 114.

The sensing device 1200 may be configured to determine user biological information at least in part by sensing or determining forces exerted on the sensing device 1200 resulting from biological processes of the user. In one example, the sensing unit 1204 includes a deformation sensor, as discussed in greater detail below with respect to FIG. 13. The sensing device 1200 may be configured to be coupled to a user's skin on or near a blood vessel of the user, such as a radial artery. That is, in this illustrative example, the sensing device 1200 may be coupled around or near a user's wrist proximate to the user's radial artery.

As a user's heart undergoes cardiac cycles, which consist of a systolic period followed by a diastolic period (or vice versa), a pressure in the user's blood vessel varies. The varying pressure in the user's blood vessel may, in turn, exert a varying force on the sensing device 1200 where the sensing device 1200 is coupled to a user on or near the user's blood vessel. In examples in which the sensing device 1200 includes a deformation sensor, the varying force exerted on the sensing device 1200 may deform the deformation sensor in varying magnitudes, which is sensed by the deformation sensor. The deformation sensor 1200 may communicate sensed information to the controller 1206 via the medium 1208, and the controller 1206 may analyze the sensed information. For example, the controller 1206 may identify a complete cardiac cycle by identifying a higher-deformation period followed by a lower-deformation period, corresponding to a systolic period followed by a diastolic period, respectively. In this manner, the sensing device 1200 may sense information indicative of a user's cardiac cycle and determine the user's heart rate from the sensed information.

As discussed above, in some examples the sensing device 1200 may be coupled around or near a user's wrist proximate to the user's radial artery or ulnar artery. For example, the sensing device 1200 may be coupled around a user's wrist or forearm. The fasteners 1202 may facilitate the coupling of the substrate 1210 around the user's wrist or forearm. For example, the fasteners 1202 may include hook-and-loop such that, when the substrate 1210 is coupled around a user's wrist or forearm, the fastener 1202a (which may include, for example, a "hook" material) and the fastener 1202b (which may include, for example, a "loop" material) overlap and mechanically couple together.

Figure 13:
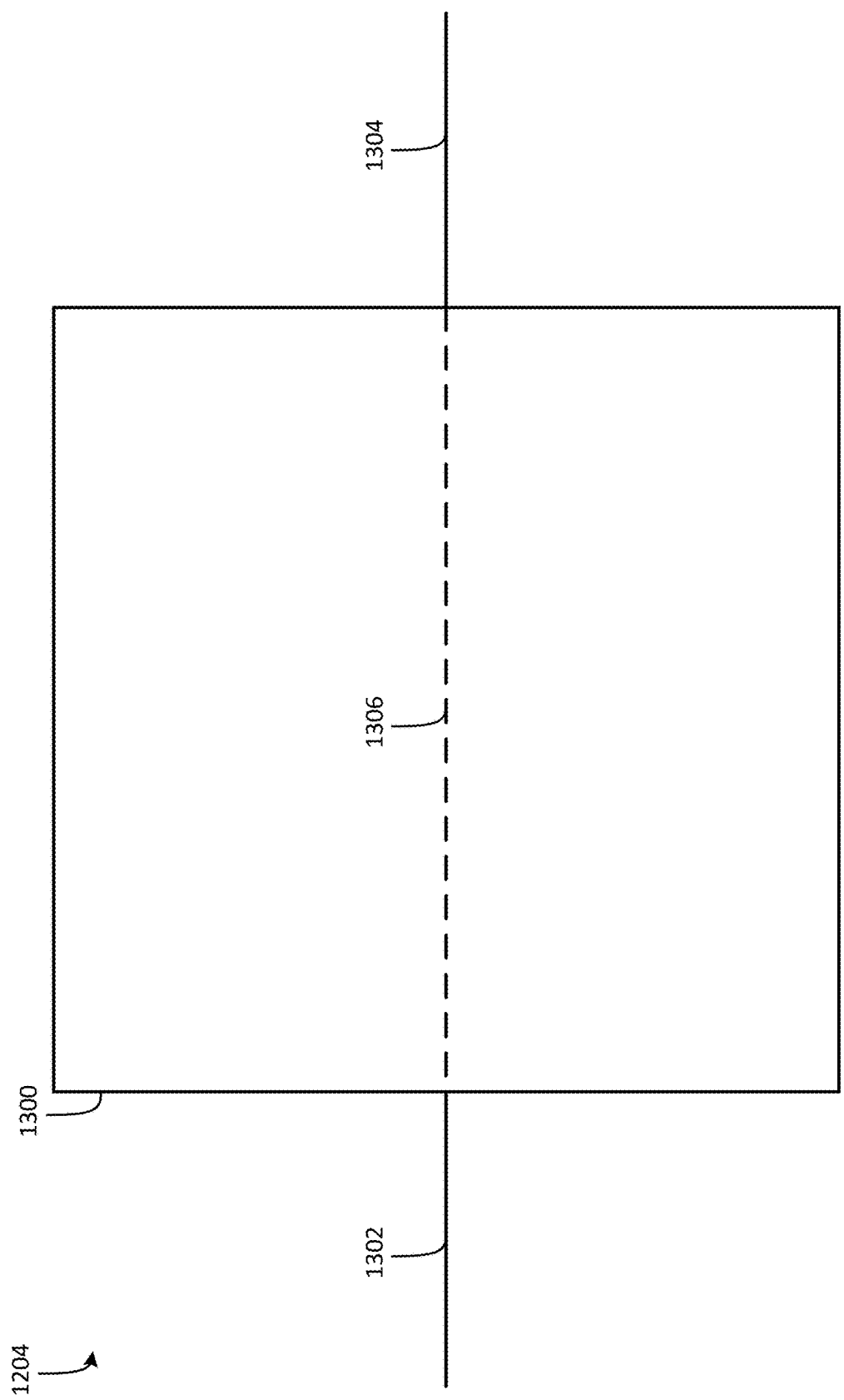
FIG. 13 illustrates a block diagram of a sensing unit according to an example.

Furthermore, and as discussed above, the sensing unit 1204 may include a deformation sensor. For example, FIG. 13 illustrates a schematic diagram of the sensing unit 1204 according to an example. The sensing unit 1204 includes a deformable sensing medium 1300, a first electrical connection 1302, and a second electrical connection 1304. The first electrical connection 1302 and the second electrical connection 1304 may be an example of, or be included within, the medium 1208.

The deformable sensing medium 1300 is physically coupled to the substrate 1210. The first electrical connection 1302 and the second electrical connection 1304 are electrically and/or physically coupled to the deformable sensing medium 1300, and may be coupled to the controller 1206. The electrical connections 1302, 1304 may be electrically coupled to one another via the deformable sensing medium 1300, as indicated in phantom by the conductive path 1306.

For example, the first electrical connection 1302 may be configured to receive a sensing signal from the controller 1206, and provide the sensing signal to the second electrical connection 1304 through the deformable sensing medium 1300 via the conductive path 1306. Properties of the sensing signal (for example, a current, voltage, or other electrical property) may vary based on a deformation level of the deformable sensing medium 1300. The second electrical connection 1304 may receive the sensing signal from the first electrical connection 1302 and provide the sensing signal to the controller 1206. Because properties of the sensing signal may vary based on the deformation level of the deformable sensing medium 1300, the controller 1206 may determine a deformation of the deformable sensing medium 1300 based on the sensing signal. In other examples, the second electrical connection 1304 may be configured to receive a sensing signal, and provide the sensing signal to the first electrical connection 1302 through the deformable sensing medium 1300 via the conductive path 1306, and the first electrical connection 1302 may provide the sensing signal to the controller 1206.

The deformable sensing medium 1300 may include a material or materials having a physical property that corresponds to a degree of deformation of the deformable sensing medium 1300. The physical property may include one of several physical properties including, for example, an electrical resistance, an electrical capacitance, an induced charge (for example, a piezoelectrically induced charge), an inductance, a refraction index, a dielectric constant, or other properties. For example, the deformable sensing medium 1300 may include a material or materials having a resistance that changes responsive to deformation of the deformable sensing medium 1300, such as such as viscoelastic graphene-polymer nanocomposites as described in *Sensitive Electromechanical Sensors Using Viscoelastic Graphene-Polymer Nanocomposites*, Conor S. Boland et al. Accordingly, when a sensing signal is provided to the deformable sensing medium 1300, properties of the sensing signal (for example, a current) may vary based on a resistance, and therefore deformation, of the deformable sensing medium 1300.

As discussed above, the deformable sensing medium 1300 may be configured to be coupled on or near a user's blood vessel. For example, the deformable sensing medium 1300 may be placed in contact with a user's skin directly above, or near, one of the user's radial arteries. During a systolic period of the user's cardiac cycle, a pressure in the user's radial arteries may increase and therefore exert a greater deformation force on the deformable sensing medium 1300. During a diastolic period of the user's cardiac cycle, a pressure in the user's radial arteries may decrease and therefore exert a lesser deformation force on the deformable sensing medium 1300. Accordingly, the deformable sensing medium 1300 may be configured to sense information indicative of a user's blood pressure, and identify a complete cardiac cycle (that is, a systolic period in combination with a diastolic period) therefrom. A user's heart rate may thereafter be determined as a number of complete cardiac cycles in a certain period of time.

Figure 14:
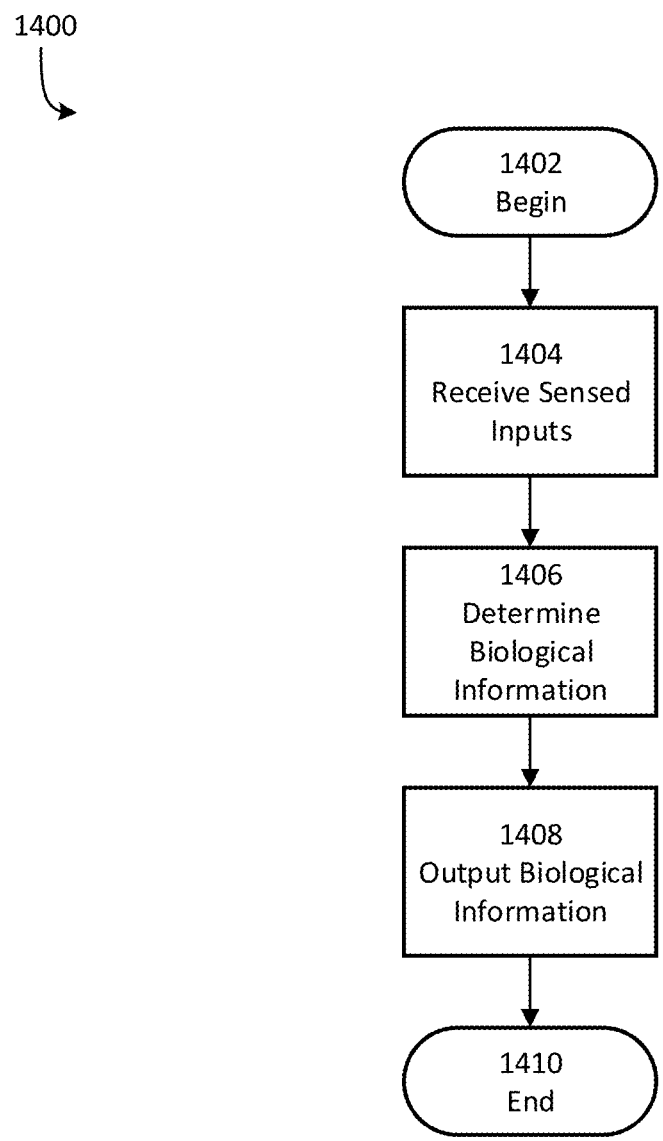
FIG. 14 illustrates a process of determining user biological information according to an example.

FIG. 14 illustrates a process 1400 of determining user biological information according to an example. The process 1400 may be executed in connection with any of several devices including, for example, the user input device 104, the user input device 300, the user input device 700, and/or the sensing device 1200.

At act 1402, the process 1400 begins. At act 1404, sensed inputs are received from one or more sensors. For example, the sensed inputs may be provided by any one of the sensor(s) 112, one or more of the sensing units 304, one or more of the sensing units 704, or the sensing unit 1204 to any one of the controllers 114, 308, 706, or 1206. Although examples have been provided in which a single sensing unit provides information indicative of user biological information, in other examples, multiple sensors may provide information indicative of user biological information. For example, the deformation level sensor 802 and the deformation change sensor 804, or sensors similar thereto, may provide information indicative of user biological information to a corresponding controller.

At act 1406, user biological information is determined. For example, a controller receiving sensed inputs at act 1404, such as any of the controllers 114, 308, 706, or 1206, may determine a user's heart rate based on the sensed inputs. In some examples, user biological information may be determined based on several sensed inputs. For example, a controller determining user biological information may receive sensed inputs over the course of at least one complete cardiac cycle of a user prior to determining the user biological information.

At act 1408, user biological information is output. For example, the device in connection with which the process 1400 is executed may include a display, and the user biological information (for example, a heart rate) may be output, via the display, to a user. In another example, the device in connection with which the process 1400 is executed may include a communication interface, such as an antenna, configured to output the user biological information to another entity. For example, the user biological information may be output to a user device such as a smartphone, laptop, tablet computer, desktop computer, or another entity. At act 1410, the process 1400 ends.

As discussed above, the electrical connections 1302, 1304 are configured to be electrically and/or physically coupled to the deformable sensing medium 1300. It is to be appreciated that the electrical connections 1302, 1304 may be coupled to the deformable sensing medium 1300 at any of various locations, and that the locations of contact illustrated in FIG. 13 are provided for purposes of example only.

The electrical connections 1302, 1304 may be physically and/or electrically coupled to the deformable sensing medium 1300 via one of several media. In one example, the electrical connections 1302, 1304 are inserted into the deformable sensing medium 1300 to establish a physical and electrical connection. In another example, a coupling medium, such as an adhesive or conductive epoxy, may be utilized to establish a physical and/or electrical connection between the deformable sensing medium 1300 and the electrical connections 1302, 1304. In yet another example, a conductive frame may be implemented to facilitate a connection between the deformable sensing medium 1300 and the electrical connections 1302, 1304.

For example, FIG. 15 illustrates a schematic view of a sensing unit 1500 according to an example. The sensing unit 1500 may be included in an example implementation of the sensing unit 1204. The sensing unit 1500 includes a deformable sensing medium 1502, a first electrical connection 1504, a second electrical connection 1506, and a frame 1508. Components 1502-1506 may be substantially similar to the components 1300-1304.

In one example, the frame 1508 is configured to be physically and at least partially electrically coupled to the deformable sensing medium 1502. For example, the deformable sensing medium 1502 may be pressed or otherwise inserted into the frame 1508, which may be rigid. The frame 1508 may further be configured to be physically and electrically coupled to the electrical connections 1504, 1506. For example, the electrical connections 1504, 1506 may be at least partially wrapped around respective portions of the frame 1508, or may be coupled to the frame 1508 via another coupling mechanism including, for example, an adhesive, conductive epoxy, or other coupling mechanism.

The frame 1508 may be at least partially conductive. For example, the frame 1508 may only be substantially conductive at one or more points of contact with the electrical connections 1504, 1506 and at one or more points of contact with the deformable sensing medium 1502, such that a sensing signal provided by one of the electrical connections 1504, 1506 to the frame 1508 does not conduct fully around the frame 1508 (that is, does not conduct directly between the electrical connections 1504, 1506 through the frame 1508, thereby bypassing [which may include shorting] the deformable sensing medium 1502). Rather, a sensing signal provided by one or more of the electrical connections 1504, 1506 may be provided through a conductive portion of the frame 1508 to the deformable sensing medium 1502, and thereafter from the deformable sensing medium 1502 through another conductive portion of the frame 1508 to the other of the electrical connections 1504, 1506.

For example, a first region 1510 of the frame 1508 and a second region 1512 of the frame 1508 may be electrically conductive. The first region 1510 of the frame 1508 may be physically and electrically coupled to the deformable sensing medium 1502 and the first electrical connection 1504, such that electrical signals may be conducted, via the first region 1510 of the frame 1508, between the first electrical connection 1504 and the deformable sensing medium 1502. Similarly, the second region 1512 of the frame 1508 may be physically and electrically coupled to the deformable sensing medium 1502 and the second electrical connection 1506, such that electrical signals may be conducted, via the second region 1512 of the frame 1508, between the second electrical connection 1506 and the deformable sensing medium 1502.

Although the first region 1510 and the second region 1512 provide examples of portions of the frame 1508 that may be substantially conductive, in other examples, conductive and insulative regions may be located differently. For example, different portions of the frame 1508 may be substantially insulative and conductive provided that a direct conductive path between the electrical connections 1504, 1506 through the frame 1508 (that is, by bypassing the deformable sensing medium 1502) is not substantially present. In still other examples, the frame 1508 may be electrically conductive at all points on the frame 1508. For example, a conductivity of the frame 1508 may be less conductive than the conductivity of the deformable sensing medium 1502 to promote conduction through the deformable sensing medium 1502, rather than around the frame 1508.

In another example, the electrical connections 1504, 1506 may be directly electrically coupled to the deformable sensing medium 1502. For example, where the electrical connections 1504, 1506 wrap around the frame 1508 and therefore directly contact the deformable sensing medium 1502, electrical signals may pass directly between the electrical connections 1504, 1506 and the deformable sensing medium 1502 where the electrical connections 1504, 1506 contact the deformable sensing medium 1502 between the deformable sensing medium 1502 and the frame 1508. In such examples, the frame 1508 may or may not be electrically conductive.

In certain examples discussed above, a sensing unit configured to sense user biological information may be physically coupled to a substrate configured to be coupled to a user. In some examples, the substrate may be configured to be worn on a user's wrist or arm. In other examples, the sensing unit may be included in other substrates, such as a user's clothing. For example, the sensing unit may be included (for example, embedded) in a user's shirt or gloves where information is sensed at a user's wrist or arm. In some examples, the medium in which the sensing unit is embedded may advantageously have elastic properties to maximize contact between the sensing unit and the user's skin.

As discussed above, however, examples are provided in which user biological information is measured from a user's radial artery for purposes of explanation only. The principles of the disclosure are applicable to any of the user's blood vessels. A sensing unit configured to sense user biological information may be included in a stand-alone substrate or embedded in clothing or other worn items, and may determine information derived from blood vessels proximate to a position on the user's body at which the sensing unit is located.

Certain examples of the deformable sensing media 1300, 1502 have been provided. In other examples, other configurations of deformation sensors may be implemented. For example, the deformable sensing media 1300, 1502 may be formed having any physical dimensions and is not limited to a substantially rectangular footprint. In some examples, a surface of the deformable sensing media 1300, 1502 that may face a user's skin may have a roughly or substantially convex shape. For example, a convex shape may increase an amount of contact between the deformable sensing media 1300, 1502 and the user's skin and thereby increase a signal quality of a sensing signal.

Furthermore, in some examples, at least some portions of the sensing device 1200 may include additional components. For example, the sensing device 1200 may include an encapsulating layer of material configured to cover one or more portions of the sensing device 1200. The encapsulating layer may be configured to cover the components 1204-1208, for example, to prevent foreign entities (for example, dirt, sweat, dust, and so forth) from negatively impacting performance of electronic components and/or to prevent contact between the user's skin and the components 1204-1208. In one example, an encapsulating layer may include a polymer material.

As discussed above, devices disclosed herein may be controlled by controllers including the controller(s) 114, the controller 308, the controller 706, and the controller 1206. Using data stored in associated memory, the controllers may execute one or more instructions stored on one or more non-transitory computer-readable media that may result in manipulated data. In some examples, the controllers may include one or more processors or other types of controllers. In another example, the controllers include a field-programmable gate array (FPGA) controller.

In yet another example, the controllers perform a portion of the functions disclosed herein on a processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

Controllers described herein may be capable of identifying user biological information, and/or various gestures and/or motions based on information received from components such as the sensor(s) 112, position and/or orientation sensing unit 306, the sensing units 304, the sensing units 704, and the sensing unit 1204. For example, information received from the sensing units 304 and/or the sensing unit 1204 may include signals provided to deformation sensors such as the deformable sensing medium 402 and/or the deformable sensing medium 1300, which vary based on a resistance (and, consequently, a degree of stretching of the substrate 312 caused by user gestures and/or motions in the context of the user input device 300) of the deformation sensors.

As discussed above, gestures and/or motions may be determined based on one or both of the sensing units 304 and the position and/or orientation sensing unit 306. That is, some gestures and/or motions may be determined based on information from information received from both the sensing units 304 and the position and/or orientation sensing unit 306, and some gestures and/or motions may be determined only from information received from one of the sensing units 304 or the position and/or orientation sensing unit 306. Moreover, as discussed above, in some examples the user input device 300 may detect a gesture that corresponds to no movement or gesture being performed. That is, a user may hold an arm coupled to the user input device 300 completely stationary, and the user input device 300 may detect this lack of movement as a gesture and/or movement.

Controllers such as the controller 308 and the controller 706 may be calibrated to identify certain gestures and/or motions which, as discussed above, may include any movement of a user's body. For example, the controller 308 and/or the controller 706 may be calibrated to determine gestures such as touching a first finger and a thumb together, touching a second finger and a thumb together, touching a second finger and a thumb together twice in rapid succession, making a fist, rotating a wrist, moving a hand in a certain dimension, and so forth. A number and type of gestures may be varied according to design parameters and/or user preferences.

Calibration may include performing, by a user, a specific gesture, and receiving, by a controller, information collected during the performance of the gesture, such as information generated by the sensing units 304, the position and/or orientation sensing unit 306, and/or the sensing units 704. In use, the controller may thus be able to determine, based on received information corresponding to a gesture, that the received information is associated with a specific gesture. Calibration may be performed for each individual user, or may be performed prior to providing the user input device to users. In other examples, no calibration may be performed, and gestures may be determined in real-time by controllers such as the controller 308 and the controller 706.

In some examples, calibration may be performed with respect to determining user biological information in connection with controllers discussed herein, including the controllers 308, 706, and 1206. For example, a controller such as the controller 308, 706, or 1206 may receive information indicative of a reliable heart rate reading (for example, from a sphygmomanometer or other heart rate measurement device) from an external device and compare the information indicative of the heart rate from the external device to information indicative of the heart rate received from, for example, components of the devices 104, 300, 700, 1200, such that the information indicative of the heart rate received from the components of the devices 104, 300, 700, and 1200 may be calibrated to the reliable heart rate reading.

Having thus described several aspects of at least one example of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A user input device comprising:
   a substrate configured to couple to a user;
   at least one sensing unit, the at least one sensing unit being coupled to the substrate and including:
      a plurality of first sensors of a first sensor type and each being configured to generate a respective first signal of a plurality of first signals indicative of a change in deformation of the user's skin; and
      a plurality of second sensors of a second sensor type different from the first sensor type and each being configured to generate a respective second signal of a plurality of second signals indicative of a deformation level of the user's skin along an axis that is normal to a surface of the user's skin, wherein each second sensor of the plurality of second sensors is configured to be co-located with a respective first sensor of the plurality of first sensors; and
   a controller coupled to the at least one sensing unit, the controller being configured to:
      receive, from the at least one sensing unit, the plurality of first signals and the plurality of second signals;
      parse, based on the plurality of first signals, movement of the user into a number of one or more motions performed by a user;
      determine, based on the parsing of the movement of the user and based on the plurality of second signals, a type of the one or more parsed motions performed by the user; and
      determine at least one gesture performed by the user based on the parsing of the movement of the user into the number of the one or more motions and the determination of the type of the one or more parsed motions performed by the user.

2. The user input device of claim 1, wherein the controller is further configured to:
   determine a user input selection corresponding to the at least one gesture; and
   provide control signals indicative of the user input selection to a controllable device.

3. The user input device of claim 1, wherein each first sensor of the plurality of first sensors is directly adjacent to a respective second sensor of the plurality of second sensors.

4. The user input device of claim 3, wherein each first sensor includes a piezoelectric material.

5. The user input device of claim 4, wherein each first sensor includes a polyvinyl difluoride film.

6. The user input device of claim 3, further comprising a deformable material coupled to each second sensor, the deformable material being configured to interface with the user's skin.

7. The user input device of claim 6, wherein the deformable material reduces a pressure applied by each second sensor to the user's skin relative to a pressure applied by each second sensor without the deformable material.

8. The user input device of claim 7, wherein each second sensor is configured to sense a pressure applied to the respective second sensor.

9. The user input device of claim 8, wherein the deformable material is configured to translate a non-normal force from the user's skin to a normal force on the respective second sensor.

10. The user input device of claim 6, further comprising an electrically insulating material coupled to the deformable material and to a respective first sensor, wherein the deformable material and the respective first sensor are configured to interface with the user's skin via the electrically insulating material.

11. The user input device of claim 1, wherein the at least one sensing unit includes a plurality of sensing units.

12. The user input device of claim 1, further comprising at least one fastener configured to couple the user input device to the user.

13. The user input device of claim 12, wherein the at least one fastener is configured to enable the user input device to couple to the user's wrist.

14. A method of determining a user gesture comprising:
   determining, by each first sensor of a plurality of first sensors of a first type, a change in deformation of a user's skin;
   generating, by each first sensor, a respective first signal of a plurality of first signals indicative of the change in deformation of the user's skin;
   determining, by each second sensor of a plurality of second sensors of a second type different from the first sensor type, a deformation level of the user's skin along an axis that is normal to a surface of the user's skin, wherein each second sensor of the plurality of second sensors is configured to be co-located with a respective first sensor of the plurality of first sensors;
   generating, by each second sensor, a respective second signal of a plurality of second signals indicative of the deformation level of the user's skin;
   parsing, based on the plurality of first signals, movement of the user into a number of one or more motions performed by a user;

determining, based on the parsing of the movement of the user and based on the plurality of second signals, a type of the one or more parsed motions performed by the user; and determining, based on the parsing of the movement of the user into the number of the one or more motions performed by the user and the type of the one or more parsed motions performed by the user, at least one gesture performed by the user.

15. The method of claim 14, further comprising:

determining a user input selection corresponding to the at least one gesture; and providing a control signal indicative of the user input selection to a controllable device.

16. The method of claim 15, further comprising providing a user input device configured to couple around a user's wrist, the user input device being configured to determine the at least one gesture.

17. The method of claim 14, further comprising translating, by a deformable material coupled to a respective second sensor, a non-normal force from the user's skin to a normal force on the respective second sensor.

18. The method of claim 17, further comprising reducing, by the deformable material, a pressure applied to the user's skin by the respective second sensor.

19. A non-transitory computer-readable medium storing thereon sequences of computer-executable instructions for operating a user input device, the sequences of computer-executable instructions including instructions that instruct at least one processor to:

receive a first signal of a plurality of first signals from a first sensor of a plurality of first sensors of a first type of at least one sensing unit, the first signal being indicative of a change in deformation of a user's skin;

receive a second signal of a plurality of second signals from a second sensor of a plurality of second sensors of a second type different from the first sensor type of the at least one sensing unit, the second signal being indicative of a deformation level of the user's skin along an axis that is normal to a surface of the user's skin;

parse, based on the first signal, movement of the user into a number of one or more motions performed by a user;

determine, based on the parsing of the movement of the user and based on the plurality of second signals, a type of the one or more parsed motions performed by the user; and determine at least one gesture performed by the user based on the parsing of the movement of the user into the number of the one or more motions performed by the user and the determination of the type of the one or more parsed motions performed by the user.

20. The non-transitory computer-readable medium of claim 19, wherein the instructions are further configured to instruct the at least one processor to:

determine a user input selection corresponding to the at least one gesture; and provide a control signal indicative of the user input selection to a controllable device.

* * * * *